US010417103B2

United States Patent
Reza et al.

(10) Patent No.: US 10,417,103 B2
(45) Date of Patent: *Sep. 17, 2019

(54) FAULT-TOLERANT METHODS, SYSTEMS AND ARCHITECTURES FOR DATA STORAGE, RETRIEVAL AND DISTRIBUTION

(71) Applicant: TigerIT Americas, LLC, Seattle, WA (US)

(72) Inventors: A M Sohaib Reza, Gazipur (BD); Forhad Ahmed, Sylhet (BD); Md. Mukit Hasan Siddiquee, Dacca (BD)

(73) Assignee: TigerIT Americas, LLC, Seattle, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/913,900

(22) Filed: Mar. 6, 2018

(65) Prior Publication Data
US 2018/0217905 A1    Aug. 2, 2018

Related U.S. Application Data

(63) Continuation of application No. 14/859,677, filed on Sep. 21, 2015, now Pat. No. 10,007,585.

(51) Int. Cl.
*G06F 11/20* (2006.01)
*G06F 11/16* (2006.01)
(Continued)

(52) U.S. Cl.
CPC ...... *G06F 11/2033* (2013.01); *G06F 11/1425* (2013.01); *G06F 11/1451* (2013.01);
(Continued)

(58) Field of Classification Search
CPC ............. G06F 11/1469; G06F 11/1461; G06F 11/1464
See application file for complete search history.

(56) References Cited

U.S. PATENT DOCUMENTS 5,555,404 A     9/1996 Torbjornsen et al.
5,758,355 A *   5/1998 Buchanan ........... G06F 16/2308
(Continued)

FOREIGN PATENT DOCUMENTS

EP     2 660 723      11/2013
WO     2013/147785    10/2013
WO     2015/029139    3/2015

OTHER PUBLICATIONS

Extended European Search Report dated Jan. 14, 2019, in European Patent Application No. 16849439.1, 10 pages.
(Continued)

*Primary Examiner* — Jigar P Patel
(74) *Attorney, Agent, or Firm* — Lowe Graham Jones PLLC

(57) ABSTRACT

The disclosure is directed towards fault-tolerant methods, systems and architectures for data distribution. One method includes generating fault distribution tables. The table entries correspond to a copy of data records. The entry and copy are associated with a fault status, a node, and a group that are based on a position of the entry within the distribution table. The method also includes storing the copy of the data record that corresponds to the entry in a database that is included in a plurality of databases. In response to determining an unavailable node included in the plurality of nodes, the method determines a fault status, a node, and a group. The method provides an available node sequential access to data records that are stored in a particular database that is stored locally on the available node in a tree structure.

11 Claims, 16 Drawing Sheets

(51) Int. Cl.
*G06F 11/14* (2006.01)
*G06F 16/2458* (2019.01)

(52) U.S. Cl.
CPC ...... *G06F 11/1469* (2013.01); *G06F 11/1658* (2013.01); *G06F 11/2025* (2013.01); *G06F 11/2035* (2013.01); *G06F 16/2471* (2019.01); *G06F 11/2048* (2013.01); *G06F 2201/80* (2013.01); *G06F 2201/805* (2013.01); *G06F 2201/84* (2013.01)

(56) References Cited

U.S. PATENT DOCUMENTS

| | | | |
|---|---|---|---|
| 6,725,218 B1* | 4/2004 | Podanoffsky | G06F 16/2272 |
| 8,327,186 B2 | 12/2012 | Coatney et al. | |
| 2004/0059808 A1* | 3/2004 | Galloway | G06N 5/02 |
| | | | 709/224 |
| 2005/0039053 A1 | 2/2005 | Walia | |
| 2012/0150883 A1 | 6/2012 | Keith, Jr. | |
| 2014/0025638 A1 | 1/2014 | Hu et al. | |
| 2015/0302037 A1* | 10/2015 | Jackson | G06F 16/972 |
| | | | 707/736 |
| 2016/0171073 A1 | 6/2016 | Hattori | |

OTHER PUBLICATIONS

International Search Report and Written Opinion of the International Searching Authority dated Apr. 20, 2017, in International Patent Application No. PCT/US2016/052707, 13 pages.

* cited by examiner

```
Void responsible workers (int curPos, int curWorker, int aliveWorker, int depth)
{ if (depth == k + 1) return;
        int dist = (curPos % aliveWorker);
        if (dist == 0) dist = aliveWorker;
    int nextPosition = ⌊curPos/aliveWorker⌋;
        // find out next worker cyclically after from curWorker
    int cnt = 0; int tempw = curWorker + 1;
        for (i = 0; i < numWorker; i++) {
            if (color [i] == 0) cnt++;
            if (cnt == dist) {
                next worker = tempW;
                break;
            }
            tempW = (tempw + 1) % number;
        }
        color [next worker] = 1;
        responsible workers (nextPos, nextWorker, aliveWorker − 1, depth + 1);
}
```

*FIG. 5*

FAULT-TOLERANT METHODS, SYSTEMS AND ARCHITECTURES FOR DATA STORAGE, RETRIEVAL AND DISTRIBUTION

CROSS-REFERENCE TO RELATED APPLICATION

This application is a continuation of U.S. patent application Ser. No. 14/859,677 filed Sep. 21, 2015, which application is incorporated herein by reference in its entirety.

FIELD OF THE INVENTION

The present disclosure relates to methods, systems, and architectures for uniformly distributing data among nodes of a cluster and, more particularly, to when one or more of the nodes becomes unavailable, re-balancing the distributed data among the available nodes.

BACKGROUND OF THE INVENTION

Matching tasks often involve a large number of individual comparisons between pairs of data records. For instance, in order to find a match between a target data record, such as a fingerprint obtained at a crime scene, and source data records, such as a fingerprint database, the target data record may be compared to each record in source database. Because the individual comparisons are independent comparisons, the matching task may be parallelized by employing a cluster architecture of matching servers, or nodes.

The total time to complete the matching task is dependent upon at least the number of required comparisons and the number of cluster nodes, or workers, employed to perform the individual comparisons. Preferably, the cluster includes an adequate number of workers to timely execute the matching task and find a match between the target data and the source data. However, as the number of required comparisons per node and/or the total number of nodes increases, the likelihood that one or more individual nodes fail during the execution of the matching task also increases. Accordingly, in order for a system to complete a matching task with a significant number of required comparisons, a system that tolerates failures among the nodes is preferable. It is for these and other concerns that the following disclosure is presented herein.

SUMMARY OF THE INVENTION

The present disclosure is directed towards fault-tolerant methods, systems, and architectures for data storage, retrieval, and distribution. In various embodiments, a fault-tolerant method for distributing a plurality of data records to a plurality of nodes is disclosed. The method includes generating fault distribution tables. Each entry in the fault distribution tables corresponds to a copy of a data record. The entry, and hence the copy, is associated with a fault status, a node, and a group metadata. At least one of the entry, the node, or the group is based on a position of the entry within the distribution tables.

The method also includes, for each entry in the fault distribution tables, storing the copy of the data record that corresponds to the entry in a database that is included in a plurality of databases. The database that the data record is stored in corresponds to each of the fault status, the node, and the group that is based on the position of the corresponding entry. In response to determining an unavailable node included in the plurality of nodes, the method determines a fault status, a node, and a group based on the unavailable node and an available node of the plurality of nodes.

Furthermore, the method provides the available node access to data records that are stored in a particular database of the plurality of databases. The particular database corresponds to the determined fault status, the node, and the group that are based on the unavailable nodes and the available node. In various embodiments, the particular database is stored locally at the available node.

In some embodiments, the method further includes determining a serial identification (ID), determining a current position, determining a cyclic distance, and generating a correspondence. The serial ID is associated with a particular data record. The current position is associated with the particular data record and based on the serial ID. The cyclic distance is associated with the particular data record and based on the current position and a count of the plurality of nodes. The correspondence is between a copy of the particular data record and an entry in the one or more fault distribution tables. A position of the entry is based on the cyclic distance.

In at least one embodiment, the method further includes updating the current position, decrementing the count of the plurality of nodes, determining another cyclic distance, and generating another correspondence. The updated current position is based on a ratio of the current position and the count of the plurality of nodes. The other cyclic distance is based on the updated current position and the decremented count of the plurality of nodes. The other correspondence is between another copy of the particular data record and another entry in the fault distribution tables. The position of the other entry is based on the other cyclic distance.

In some embodiments, the method further includes sequentially accessing the data records that are stored in the particular database. The particular database is stored locally at the available node. The particular database is accessible via a tree structure. The tree structure includes a fault status level (plurality of nodes), a node level, and a group level. The data records may include a biometric template. However, other embodiments are not so limited, and the data records may include other structured data, including templates not limited to biometric applications.

Each of the plurality of databases that corresponds to a particular fault status stores a substantially equivalent number of data records. In some embodiments, the method includes providing each of a plurality of available nodes access to a substantially equivalent number of data records.

k may be a fault tolerance of the method. N may be a number of nodes included in the plurality of nodes. Each of the plurality of nodes is uniquely associated with a number of databases included in the plurality of databases. The number of databases associated with each of the plurality of nodes is equal to a product of factors including (k+1), N and (N−1). k+1 copies of each of the plurality of data records is stored in the plurality of databases.

The method further includes updating a version of the data records and synchronizing the databases that include a copy of the updated data records. The synchronizing is based on the updated version of the data records.

In some embodiments, the method further includes determining a number of initially available nodes (N). Generating the fault distribution further includes generating N fault distribution tables. Each of the N fault distribution tables corresponds to one of the N initially available nodes. A copy of each of the plurality of data records that corresponds to an entry in a particular fault distribution table of the N fault distribution tables is stored locally at the node that corresponds to the particular fault distribution table.

k is a fault-tolerance of the method and is less than N. Each of the N fault distribution tables includes k+1 columns. Each entry in a particular column in each of the N fault distribution tables is associated with a failure status based on the particular column. A distribution of k+1 copies of each of the plurality of data records is distributed among the N fault distribution tables. The distribution may be a deterministic and a substantially uniform distribution.

The available nodes are able to compare each of the provided portions of copies of the data records with a target data record. Some embodiments, in response to determining the one or more unavailable nodes, include updating a system bit mask. The system bit mask indicates an availability status for each of the nodes. In at least one embodiment, each of the nodes locally stores a corresponding portion of the plurality of the databases in a tree structure.

Furthermore, various embodiments of non-transitory computer-readable medium are disclosed. The medium includes contents that, when executed by a computing device, perform any of the various methods disclosed herein. Additionally, various computing systems are disclosed. The computing systems include a plurality of nodes, a processor device, and a memory device. One or more modules are stored in the memory device. The modules are configured so that when executed by the processor device, the modules perform any of the various methods disclosed herein.

In some embodiments, the system further includes at least one transaction manager module, a version manager module, or a synchronization manager module. The transaction manager module is configured to add, update, or delete one or more of the plurality of data records. The version manager module is configured to determine a latest transaction from a plurality of transactions managed by the transaction manager module. The synchronization manager module is configured to synchronize the plurality of nodes.

BRIEF DESCRIPTION OF THE DRAWINGS

Preferred and alternative examples of the present invention are described in detail below with reference to the following drawings:

FIG. 5 provides pseudo-code form implementing one embodiment of a process for inserting references to the k+1 copies of a source data record into N k-fault distribution tables.

DETAILED DESCRIPTION

Figure 1:
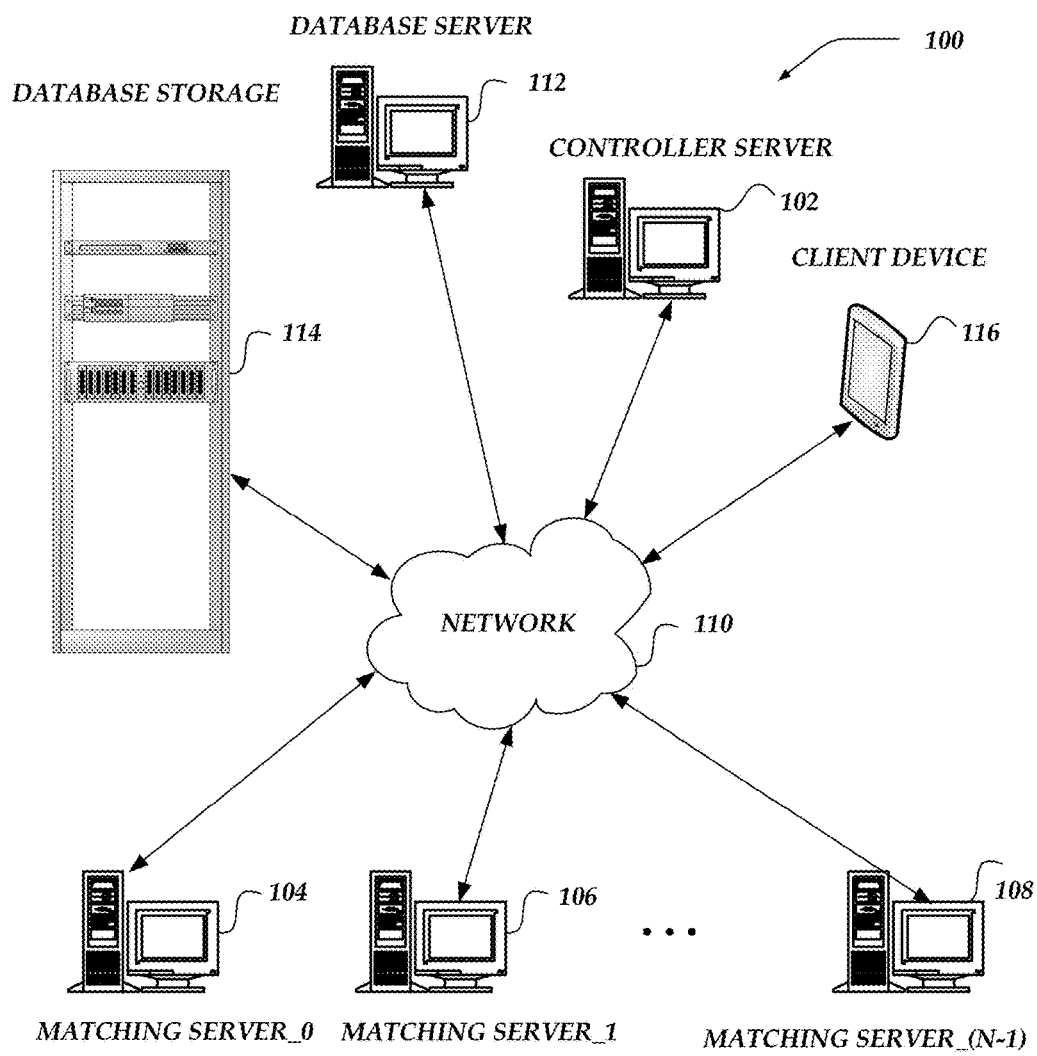
FIG. 1 is a system diagram of an environment in which embodiments of the invention may be implemented.

As a primary matter, the system, method, architecture, and device embodiments disclosed herein are applicable for any parallelizable task that includes distributing operations or sub-tasks involving individual data records amongst a plurality of computing devices, matching servers, cluster nodes, or the like. Many of the exemplary embodiments discussed herein involve matching and/or comparing biometric template data records, however, it is to be understood that each of these embodiments may be modified to address other types of data records and/or parallelizable tasks.

The matching of a target data record, such as a biometric template (fingerprints, facial, iris, and other bio-features) requires a comparison between the target data record and each of a plurality of source data records within a database. As the number of records in the source database grows, the number of required comparisons also grows. Accordingly, in order to reduce the required execution time for these comparisons, the individual comparisons may be distributed amongst a plurality of matching servers, nodes, or workers.

Various embodiments disclosed within are directed towards improving the fault tolerance and overall efficiency of such distributed architectures and systems. Specifically, the embodiments are directed towards increasing or enhancing the efficiency of distributing, storing, and retrieving the data records analyzed in a parallelizable task implemented on a fault-tolerant architecture. In regards to distributing the data records, various embodiments enable uniformly distributing data records among the matching servers so that the difference between the maximum and minimum number of data records distributed between any two matching server devices is minimal.

To begin the matching process, each of the matching servers may access a portion of the source data records, such as those that have been initially distributed to the server. Accessing the data records may include retrieving or receiving the data records from one or more databases. The retrieved portion is locally stored or cached at the matching server.

Copies of other source data records may be stored at the matching server in the event that the server that the other data records were initially distributed to fails, or otherwise becomes unavailable. In some embodiments, to insure efficiency, only a single copy of each data record is retrieved from the database. Thus, only one matching server at a time is retrieving the source data records from the database.

In the event of one or more failures of the matching server, additional copies of the data records, that were assigned to the failed servers, are be retrieved by the still functioning or available matching servers. These additional data record copies are then analyzed or matched by the still available matching servers. As discussed below, the data records or objects are distributed amongst a plurality of databases, so that the data records are retrieved sequentially, rather than randomly. This feature minimizes database access and retrieval time.

Regarding the fault tolerance of the system, various embodiments enable continuity of matching tasks, with minimal possible downtime, when one or more of the matching servers fail. Accordingly, as discussed throughout, various embodiments are operative to redistribute matching tasks in the event of one or more matching servers failing, or otherwise becoming unresponsive. That is, the various embodiments include fault-tolerant systems. To complement the fault-tolerance of a system, various embodiments include hardware redundancy, such as additional matching servers. To further compliment the fault-tolerance of the systems, various embodiments include redundancy in the storage of the data records ensure that the data to be analyzed and/or compared is readily available in the event of a matching server failure. The combination of fault-tolerance, hardware redundancy, and storage redundancy results in extremely robust and reliable systems.

When a matching server fails, the still functioning servers automatically retrieve or fetch (from the databases) data records that were initially assigned to the failed servers so that the matching operation continuous with minimal downtime. The workload is rebalanced so that load that was initially distributed to the failed matching servers is uniformly re-distributed to the still available matching servers. The still available servers uniformly fetch the data records so that no data record is retrieved by two or more still available matching servers. An efficiency in resource consumption is increased, while achieving an enhanced response to enable faster matching.

Various embodiment include a substantially uniform distribution of data records among the matching servers. Furthermore, in the event of one or more faults or failures in the matching servers, the load remains balanced among the still available servers. Furthermore, network bandwidth, as well as access time for the retrieval of data records when servers fail, is decreased.

Systems, architectures, and methods are disclosed for data distribution, storage, and retrieval such that during any matching operation, if one or more servers fail, there is still continuity of the matching operation with a decreased loss in speed and resource consumption. Various embodiments include a substantially uniform or equal distribution of replicated data records among the nodes of a matching server cluster.

Illustrative Operating Environment

FIG. 1 is a system diagram of an environment in which embodiments of the invention may be implemented. Not all of the components may be required to practice the various embodiments, and variations in the arrangement and type of the components may be made without departing from the spirit or scope of the invention. As shown, system 100 of FIG. 1 include a plurality to matching servers (104, 106 and 108). Each of the plurality of matching servers 104-108 may be a node in a matching cluster. Thus, in various embodiments, system 100 includes a cluster of matching server devices (104, 106 and 108), a controller server device 102, a database server 112, database storage 114, and one or more client devices 116, each are enabled to communicate over a generalized communication network 110. Various embodiments of the matching servers 104-108, the controller server device 102, the database server, client device 116, and the like may be implemented in any of the various embodiments of the computing device 1200 of FIG. 12.

Database server 112 controls, manages, and queries data objects stored on database storage 114. In various embodiments, there are N matching servers where N is a positive integer. The matching servers are indexed as $0, 1, \ldots, N-1$. The matching servers 104-108 may be worker nodes/servers. The controller server 102 may be a master server.

Because a matching task is subdivided into smaller independent tasks (comparison tasks), the matching task is controlled by controller server 102 and distributed to the matching servers 104-108. A comparison task includes a comparison between the target data record and one of the source data records.

System 100 is a fault-tolerant system, such that when one or more of the matching servers 104-108 fail prior to or during a matching task, the still functioning servers "take up the slack" of the failed servers to complete the matching task. The level of fault tolerance is quantified by the fault tolerance parameter k, which corresponds to the maximum number of matching servers in the matching cluster that may fail, while system 100 maintains operation during an ongoing matching task. Because at least one matching server is required to perform the comparisons of the data records, k is an integer and $0 \leq k < N$.

The matching servers include an associated lifetime or life cycle. The controller server 102 distributes a workflow or load of a matching task and controls each of the matching servers during the comparison tasks, via commands transmitted over network 110. The sub-tasks distributed to each matching server depends on the total number of pairings of data records to be matched, the number of matching servers (N), and a fault tolerance level (k) of system 100.

In embodiments, the number of source data records to be searched over is represented by a positive integer M, which is typically greater than N. If there is no matching server failure during the matching task, each of the N matching servers 104-108 would perform ~M/N comparison tasks. If k matching servers were to fail during the matching operation, each of the remaining, or still available, matching servers would perform at most M/(N−k) comparison tasks during the overall matching task.

When system 100 receives a target data record to be matched with one or more source data records stored in database storage 114, controller server 112 checks on the availability of each of the matching servers. For instance, client device 116 may provide system 100 a new target data record to be matched, via network 110. The controller server 112 requests that the available matching servers match the new target data record with source data records in databases managed by database server 112 and stored in database storage 114.

In an exemplary embodiment, a fingerprint source database includes fingerprint records of 1000 citizens (M=1000) is to be searched for a match with a target fingerprint record. System 100 includes five matching clusters (N=5). In this exemplary embodiment, fault tolerance is not implemented and thus k=0. Initially, the M source data records are uniformly distributed to the N matching servers, via a round robin (RR) scheduling or distribution method.

Each of the initially available matching servers 104-108 may be indexed, such as matching severs 0, 1, . . . , N-1. Furthermore, each source record to be considered is sequentially serialized to include a unique serial identification (ID) Tag or identifier (S). In various embodiments, S=0, 1, . . . , M-1.

When initially distributing the M records amongst the N matching servers, a RR distribution method is applied. As such, each record that satisfies 0=S % M is distributed to the matching sever that is indexed as 0 (matching server_0 104), where % represents the modulo operator, S is the dividend, and M is the divisor. Likewise, each source record that satisfies 1=S % M is distributed to the matching server indexed as 1 (matching server_1 106) and each record that satisfies (N-1)=S % M is distributed to the matching server indexed as N-1 (matching server_(N-1) 108).

When each worker or matching server finishes comparing the target data record to each of the source data records distributed to it, the matching servers return the matching results to controller server 102. The master or controller server 102 integrates, blends, or otherwise organizes the search or matching results into a search report and returns the results to client device 116 via network 110. Under this implementation (k=0), if one of the matching servers fails during the matching tasks, the source data records distributed to the failed server are not searched for a comparison.

Thus, to complete a matching task when k=0, no servers may fail within the time it takes each of the matching servers to complete each of the comparison tasks that have been distributed to the matching server. If p represents the probability of an individual matching server failure within the average matching time period, then the probability that at least one server fails during a matching task distributed to the servers is $$=1-(1-p)^N$$

Accordingly, for any non-zero p, as N increases without bound, the probability of at least one fault asymptotically approaches certainty. Furthermore, the time to complete the matching task may be approximated as (M/N)*f, where f is the comparison frequency of an average matching node (the number of comparisons per second per node). Thus, as M increases, the time to complete the matching task also increases. Typically, an increased time in completing the matching task results in an increased p. A larger p results in a steeper approach (as N increases) to a high probability in performing a matching task prior to at least one matching server failure. Accordingly, in preferred embodiments, fault tolerance is implemented and k≥1.

Implementing Fault Tolerance

In preferred embodiments, k≥1 and k+1 separate copies of each source data record are stored in distributed to the matching servers, nodes, or workers and stored in one or more databases. For instance, as will be discussed in detail below, in some embodiments, these M*(k+1) copies of source data records are distributed among (k+1)*N*(N-1) separate source databases of each worker for faster retrieval of data.

When at most k matching servers are down, the remaining matching servers fetch at least a portion of the redundant copies of the source data records that were previously distributed to the malfunctioning serves from the databases. Accordingly, in preferred embodiments, the available bandwidth in network 110 is held approximately constant during the execution of a matching task.

Figure 2:
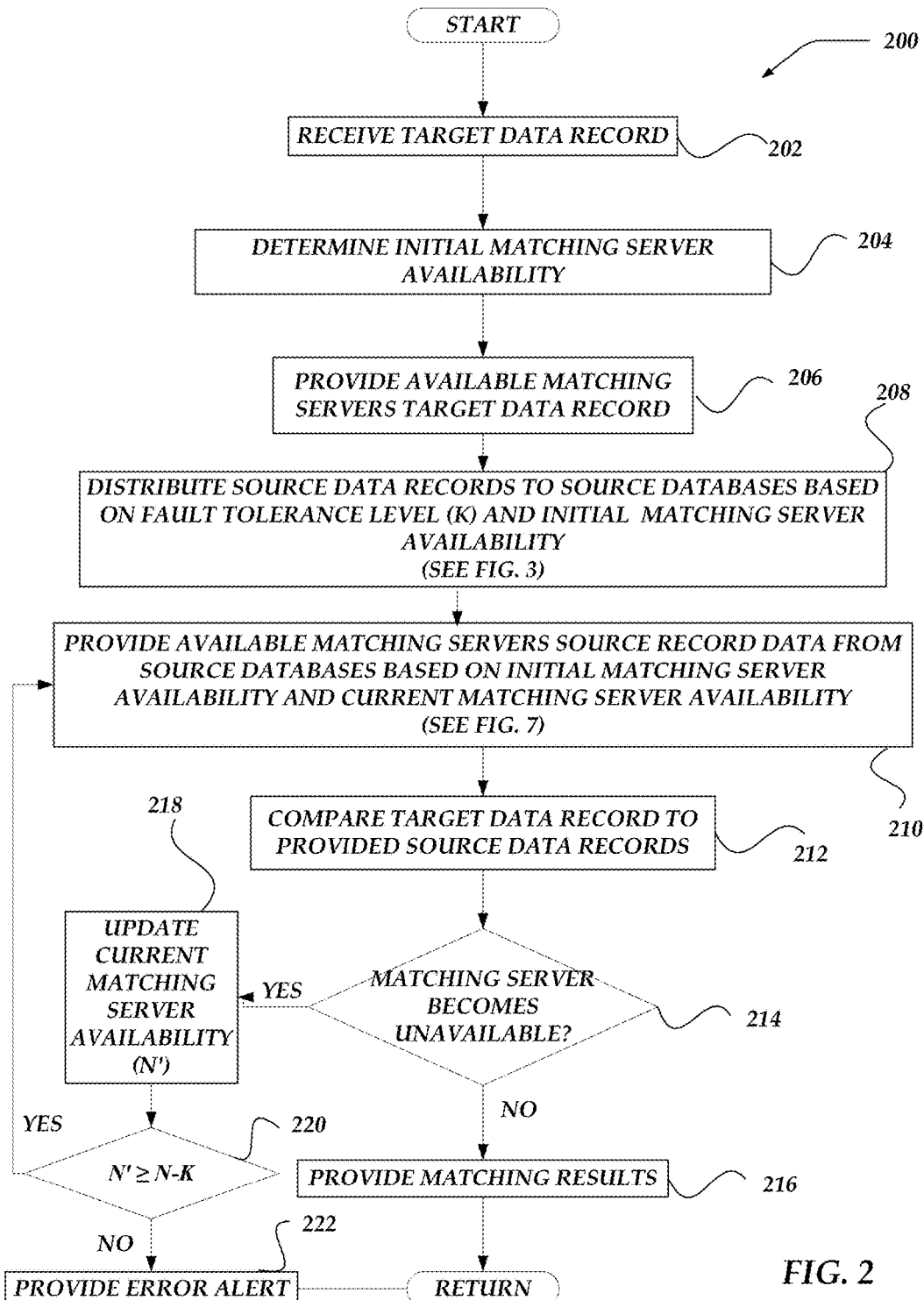
FIG. 2 illustrates a logical flow diagram generally showing one embodiment of a fault-tolerant matching process consistent with the embodiments described herein.

FIG. 2 illustrates a logical flow diagram generally showing one embodiment of a fault-tolerant matching process consistent with the embodiments described herein. In various embodiments, process 200 is directed to searching for one or more matches of a target data record within a collection of source data records. For instance, the target data record may be a fingerprint template and the source data records may include previously collected fingerprints or fingerprint templates.

A comparison between the target data record and each of the source data records is initially distributed to a plurality of matching servers. The number of initially available matching servers is denoted by integer N. The target data record must be compared to M separate and independent source data records. During such a matching task, process 200 tolerates the unavailability or failure of k of the initially available matching servers, such that the matching task may be completed by the remaining or still available (N-k) matching servers. To implement the fault tolerance, process 200 generates redundant copies of each of the source data records. In a preferred embodiment, process 200 stores or distributes k+1 copies of each of the M source data records into (k+1)*N*(N-1) separate databases organized in a tree structure. The tree structure of the multiple databases ensures that the redundant copies of the source data records are readily available for access when a matching server fails.

Process 200 decreases the required number of comparison tasks or operations per node. Furthermore, process 200 provides scalability as one or both of N and M is increased. Process 200 eliminates the need to duplicate or replicate comparisons between the target and source data records, even in the event of multiple node failures. The operations per node are uniformly distributed among the nodes. When one or more of the nodes fails, the comparison tasks are re-balanced among the surviving nodes such that the operations remain uniformly distributed among the available nodes throughout the matching task.

For instance, in the event of a loss of availability of matching nodes, the distribution is re-balanced among the remaining nodes such that the load remains substantially balanced throughout the execution of process 200. Furthermore, in the event of the loss of a matching server, process 200 decreases a system downtime associated with re-distributing and re-balancing the matching tasks among the remaining matching nodes. This downtown is decreased at least because of serial accessing of the redistributed comparison tasks.

Process 200 begins after a start block at block 202, where a target data record is received. For instance, a client device, such as client device 116 of FIG. 1, may provide a target data record to be matched and/or compared to each the source data records. In other embodiments, the target data record is provided via other means. The client device may provide the target data record to a controller server, such as controller server 102 over a network, such as network 110, of FIG. 1.

At block 204, an initial matching server availability is determined. In at least one embodiment, the controller server queries each of the matching servers or nodes of the matching cluster to determine an initial availability of individual the matching servers. If a matching server is functioning properly and has available bandwidth to provide matching or comparing services, the matching server provides an indication, to the controller server, that the matching server is available. In a preferred embodiment, determining the matching server availability includes at least determining how many N matching servers are included in the system.

In some embodiments, determining the initial matching server availability includes determining an initial system bit mask, where the system bit mask tracks which of the N matching servers are available and which of the N matching servers are not available. The system bit mask includes N bits, where a 1 in the ith position of the mask indicates that the server indexed as i is not available and a 0 in the jth position indicates that the matching server indexed as j is still available. In an embodiment where N=5 and each of the five servers is initially available, then the initial system bit mask is [0, 0, 0, 0, 0]. The system mask is updated throughout the matching task. For instance, if the matching server indexed as 4 fails during the matching task, the initial system bit mask is updated to [1, 0, 0, 0, 0].

In at least one embodiment, the fault tolerance level, k, is determined based on the number of initially available matching servers. For instance, k may be determined based on a predetermined fraction and N. k may be automatically determined based on either the floor or ceiling of $\rho*N$, where $0 \leq \rho < 1$. In other embodiments, such as the user of the client device or the controller server may set the value of k which is also factored by hardware specifications and required matching time At block 206, the received target data record is provided to each of the initially available matching servers. In at least one embodiment, the control server provides the target data record to the available matching servers via the network. The target data record is provided to each of the matching servers so that a matching server may compare the target source data record to each of the source data records distributed to the marching server.

At block 208, the source data records are distributed to a plurality of source databases. Various detailed embodiments for processes that distribute source data records to source databases are discussed at least in the context of FIG. 3. However, briefly, at block 208, for each initially available matching server, a k-fault distribution table is generated. A k-fault distribution table indicates which source data records are initially distributed to which associated matching server. For each source data record distributed to a matching server, unless the matching server becomes unavailable during the execution of the matching process, the matching server compares the provided target date record to each of the source data records initially distributed to the matching server.

Furthermore, the distribution tables indicate the re-distribution or re-balancing of the source data records for when a matching server fails during a matching task. For instance, in the event of one or more matching server failures or a previously available matching server becoming unavailable, the distribution tables indicate the details of re-distributing the affected source data records amongst the still available matching servers. Based on these k-fault distribution tables, the source data records are distributed and/or inserted into a plurality of source databases.

In preferred embodiments, the source databases are arranged in a tree structure, such that the databases are the leaves of the tree. When an available matching server is required to access a source data record for comparison to the target data record, the sourced data record is sequentially accessed or retrieved from the corresponding source database. The branches of the tree are traversed to the corresponding leaf and the source data records within the source databases are sequentially read, resulting in a faster access time. This faster access time enables a decreased downtime during matching server failures.

At block 210, the source data records are provided to the available matching servers. Various detailed embodiments for processes that provide source data records to the available matching servers are discussed at least in the context of FIG. 7. However, briefly, at block 210, the source data records are provided based on the initial matching server availability and the current matching server availability. So that individual comparisons are not redundantly performed, only those source data records that are distributed to a particular matching server are provided to that matching server. At the first arrival at block 210, process 200 provides the source data records as initially assigned to the initially available matching servers, i.e. as indicated by the $0^{th}$ column of each k-fault distribution table. As discussed below, in the event of a matching server becoming unavailable, at least a portion of the source data records initially distributed to the failed server are provided to the remaining available matching servers to re-balance the distributed workflow or load.

At block 212, the currently available matching servers provide matching or comparison services. In at least one embodiment, the matching servers compare that target data record to the provided source data records. For instance, a particular matching server may compare the target source data record to each of the source data records distributed to the particular matching server.

At decision block 214, it is determined whether one of the previously available matching servers becomes unavailable. For instance, if a matching server fails, transitions to an offline mode, or otherwise becomes unavailable during the execution of the matching task, process 200 flows to block 218. Otherwise the matching task is completed, and process 200 flows to block 216. At block 216, the matching results are provided. In some embodiments, each of the still available matching servers provides the completed matching results to the controller server. In at least one embodiment, the controller server provides at least a summary of the results to the client device. Upon completion of block 216, process 200 is terminated.

At block 218, the current matching server availability is updated to reflect the variance or change in the matching server availability of decision block 214. For instance, the system bit mask may be updated, and the bit corresponding to the failed server is transitioned from a 0 to a 1. In various embodiments, the number of currently available or still available matching servers N' is tracked. In such embodiments, N' is decremented, such that N' is equal to the total number of 0s in the system bit mask.

At decision block 220, it is determined if enough matching servers are still available to continue the matching task, in view of the updated current matching server availability of block 218. In various embodiments of a k-fault tolerant system, at least (N−k) matching servers must be available to complete the matching task. Thus, in at least one embodiment, if N'≥(N−k), then process 200 proceeds back to block 210. Otherwise, process 200 proceeds to block 222. At block 222, an error alert is provided that indicates that the number of failures in process 200 excess the fault tolerance level. After block 222, process 200 may terminate and/or return to a calling process to perform other actions.

Upon returning to block 210, the work load is rebalanced and the source data records that were distributed to the failed matching server are provided to the still available matching servers based on the updated and/or current matching server availability.

Distributing the Matching Task Among the Matching Servers

Figure 3:
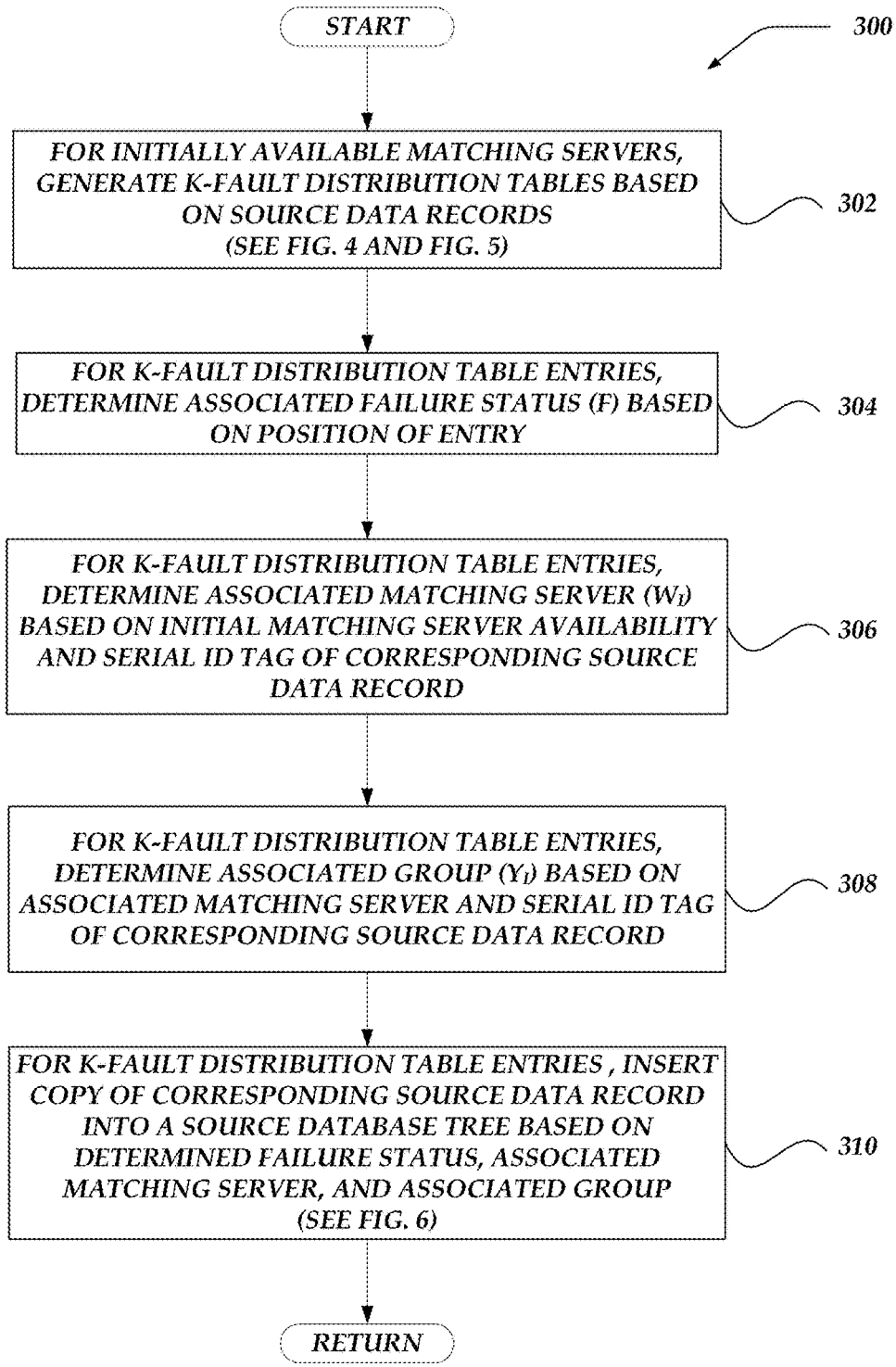
FIG. 3 illustrates a logical flow diagram generally showing one embodiment of a process for distributing redundant copies of source records in source databases consistent with the embodiments described herein.
Figure 4:
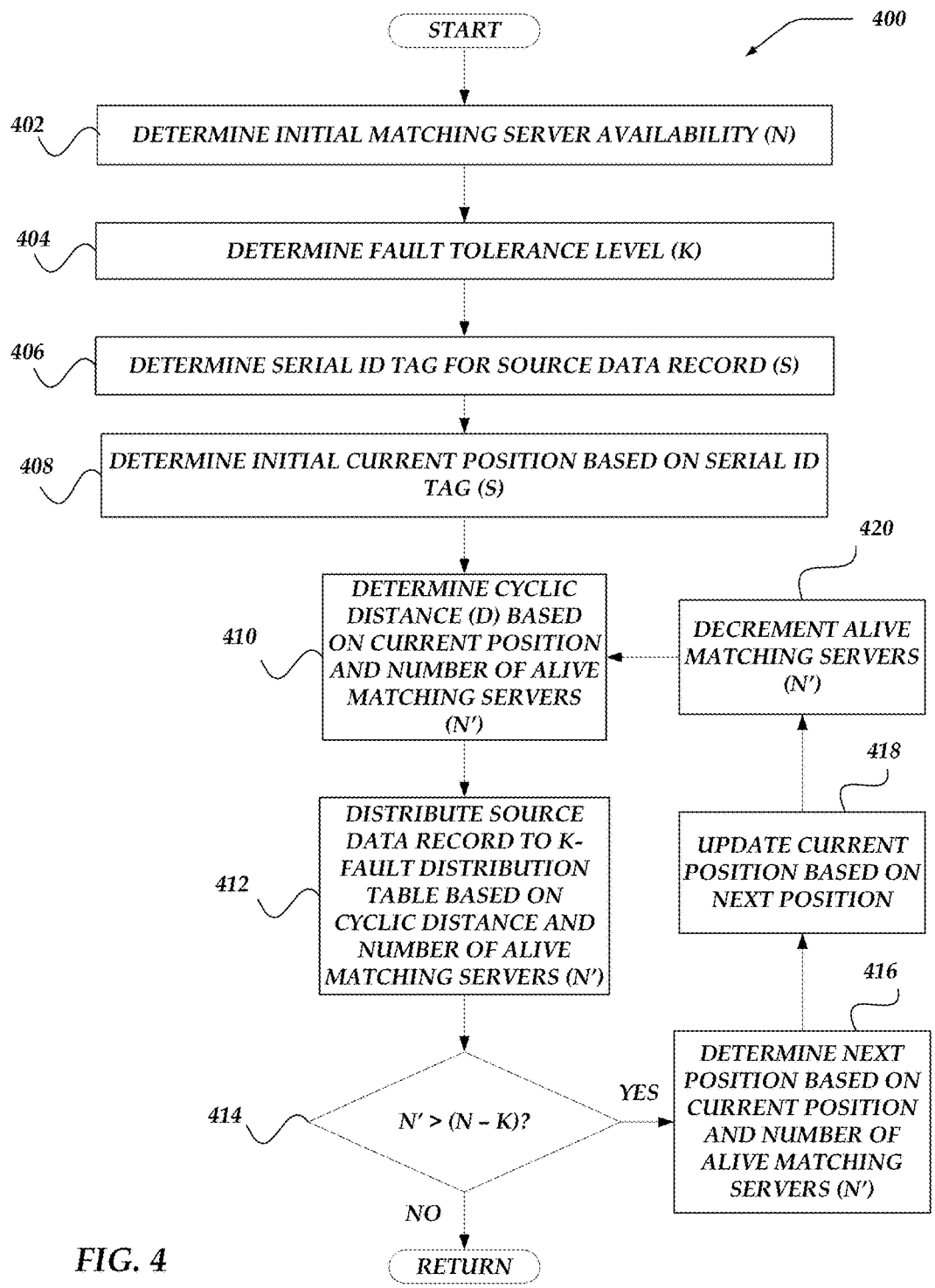
FIG. 4 illustrates a logical flow diagram generally showing one embodiment of a process for inserting references to k+1 copies of a source data record into N k-fault distribution tables.

FIG. 3 illustrates a logical flow diagram generally showing one embodiment of a process 300 for distributing redundant copies of source records in source databases consistent with the embodiments described herein. After a start block, process 300 proceeds to block 302 where a k-fault distribution table is generated for each initially available matching server. FIGS. 4 and 5 show details regarding various embodiments of processes for generating the k-fault distribution tables.

Briefly, a k-fault distribution table is generated for each of the initially available matching servers. For N initially available servers, a k-fault distribution table is generated. For convenience, each of the N matching servers and the k-distribution table may be indexed, where the corresponding server/table indexes range from 0 to N−1.

Each entry of each distribution table includes a reference to a copy of one of the source data records, where a total of M source data records are to be distributed to the N matching servers for the matching task. Each of the M source data records is associated with a corresponding unique identifier. The unique identifier may be a serial identification number (ID). The serial ID may be a serial ID Tag. Serial ID Tag is a non-negative integer, or some other unique number or address. For instance, the first data record may be associated with the serial ID of 0 and the Mth source data record may be associated with the serial ID of M−1. In various embodiments, the serial ID Tag for the data record associated with the entry is referenced as S, where 0≤S<M.

The reference to the copy of the source data record, in the distribution table entry, may include the serial ID Tag S. In other embodiments, the reference may include a link or pointer to the copy of the data record stored in a source database. In at least one embodiment, the entry includes a copy of the data record. The entry may additionally include a data mask that indicates which data record a matching server should pick up in the event that another matching server fails.

In various embodiments, k+1 copies, or references to copies, of each of the M source data records are inserted into the tables, as entries of the tables. Thus, M*(k+1) copies of source data records are distributed over N tables. In some embodiments, M>>N. Each distribution table includes ceiling(M/N) rows and k+1 columns, where ceiling( ) is the ceiling function. A particular copy of a particular source data record is uniquely associated with a particular column and a particular row of a particular distribution table.

One advantage of the various embodiments discussed herein includes the substantially uniform distribution of the comparison tasks among the available servers, even in the event of failure of up to k servers. The k-fault distribution tables provide the distribution of the data records, as a function of how many and which particular server has failed.

The first column in the ith distribution table (where i refers to the table index) includes copies of data records that are initially distributed to the ith matching server. Each of the N initially available servers are initially assigned ceiling(M/N) or ceiling(M/N)−1 source data records. The second column includes references to copies of source data records that were initially distributed or assigned to other servers. In the event that one of those other servers fails (for instance, the jth server), at least a portion of the source data records positioned in or associated with the second column of the ith table will be re-distributed to the ith server.

So that the distribution of the comparison tasks among the available servers remains substantially uniform during the matching task and when servers fail, the k+1 copies of a particular source data record are uniformly and deterministically distributed among the columns and rows of the N k-fault distribution tables. As such, copies of a particular source data record appear in k+1 of the N tables. Thus, k+1 tables include exactly one reference to a copy of the particular source data records and the other (N−k−1) tables include no references to copies of the particular source data record.

The copies of a particular source data record are distributed uniformly and deterministically over the column indexes. As such, each of the k+1 copies of a particular source data record is associated with a particular k+1 column indexes exactly once. If the mth copy of a source data record is positioned in the nth column of the sth distribution table, none of the other k copies of that source data record will appear in the nth column of any of the other N−1 k-fault distribution tables.

At block 304, an associated failure status is determined for each entry in each of the k-fault distribution tables. The associated failure status for the entry is based on the positioning of the entry in the particular k-fault distribution table. The associated failure status may be indexed by F, where 0≤F≤k and F indicates the number of server failures arrived at by the data record associated with the entry at a particular matching server. In a preferred embodiment, the associated failure status is based on at least the column of the entry. For instance, for a given table entry, F is equivalent to the index associated with the column of the entry (column indexes range between 0 and k).

At block 306, an associated matching server (W) is determined for each entry in each of the k-fault distribution tables. In preferred embodiments, the associated matching server is the corresponding matching server for the k-fault distribution tables that the entry is included within, and $0 \le W_i \le N-1$. Accordingly, for an entry in the ith column of the jth distribution table, where the jth table corresponds to the jth matching server, the associated failure status is F=i and the associated matching server is W=j. As is further discussed in the context of FIGS. 4 and 5, the failure status and the associated matching server for an entry (an associated reference or copy of the source data record) is based on the initial matching server availability the serial ID S associated with the source data record. In at least one embodiment, $W_i$ is determined via a round robin method.

At block 308, an associated group ($Y_i$) is determined for each entry in each k-fault distribution table. The associated group for an entry in the lth column corresponds to the matching server that the associated data record will be assigned to in the event of a matching server failure. Accordingly, in the first column for ith distribution table, each data record is associated with one of the groups ranging from 0 to N−2, where the group number corresponds to which of the still functioning N−1 servers the data record will be re-assigned in the event that the ith matching server fails. Similarly, the group numbers associated with entries in the second column range from 0 to N−3 and indicate which the still available N−2 servers the data record will be re-assigned in the event that both the ith and another matching server fail.

In various embodiments $Y_i$ is determined by the following pseudo-code

If $(W_i == 0)$, then $Y_i = \left(\dfrac{\text{Serial}}{\text{Number of Workers}}\right) \% \text{ (Number of Workers } - 1\text{)}$, else, $Y_i =$ $\left(\dfrac{(\text{Serial} + (\text{Number of Workers} - W_i))}{\text{Number of Workers}}\right) \% \text{ (Number of Workers } - 1\text{)}$ At block 310, a copy of a corresponding source data record for each of the entry in each k-fault distribution table is placed within a source database tree. Various embodiments for placing a source data record in a source database tree are discussed in the context of FIG. 6. However, briefly, the position of the copy of the source data record within the source database tree is based on the failure status, associated matching server, and associated group for each entry.

Figure 6:
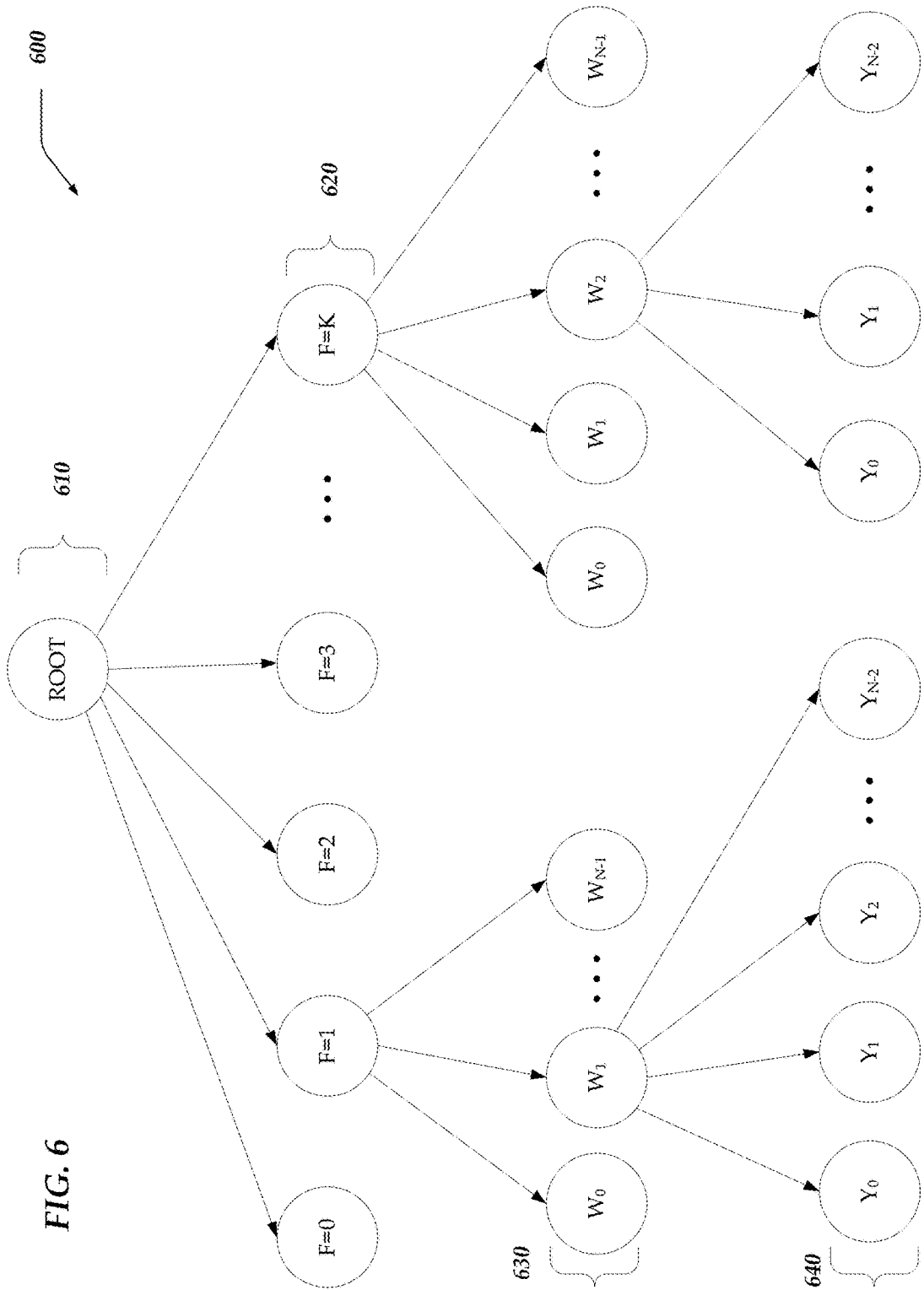
FIG. 6 shows a tree structure format for organizing databases that store the multiple copies of the source data records.

Tree 600 of FIG. 6 includes four levels, in descending order: root level 610, failure status level 620, matching server level 630, and group level 640. The individual nodes at the group level 640 are the individual databases that store the copies of the source data records. The copy of the source data record associated with each of the k-fault distribution table entry is inserted into the database that corresponds traversing tree 600, starting at root level 610, traversing to the node in the fault status level 620 that corresponds to the fault level F (determined at block 304), further traversing to the node in the matching server level 630 that corresponds to the matching server $W_i$ (determined at block 306), and traversing to the node in the group level 640 that corresponds to the group $Y_i$ (determined at block 308).

Note that the fault status level 620 includes k+1 nodes. The matching server level 630 includes N nodes and the group level 640 includes N−1 nodes. Accordingly, there are (k+1)*N*(N−1) total databases represented by the nodes in the group level 640.

Each of the M*(k+1) k-fault distribution tables entries is inserted into one of the databases represented by the nodes in the group level 640 of tree 600 of FIG. 6. The k+1 copies of the M source data records are distributed uniformly and deterministically among the databases.

In a preferred embodiment, a tree structure of databases, such as tree structure 600 is stored locally at each of the N nodes. The databases within the tree structure stores the copies of the data records that are associated with each of the k-fault distribution tables for the corresponding node. Thus each of the N nodes stores a local copy of each of the data records within its k-fault distribution table in a plurality of databases in a tree structure.

Accordingly, when a node fetches the data in the event of a failure of another node, the still available node fetches a local copy, which minimizes the network traffic required during node failures. Accordingly, in the various embodiments, there are N unique tree structures, each including (k+1)*N*(N−1) unique databases that are stored locally at the corresponding node. The k+1 copies of each of the M events are distributed uniformly and deterministically among the N*(k+1)*N*(N−1) total databases of the entire system. Each of the N*(k+1)*N*(N−1) databases includes a unique combination of the M data records, based on the k-fault distribution table of the corresponding node. Thus, each of the N node stores a local copy of each source data record that it would analyze in the event that one or more other nodes becomes unavailable. After block 310, process 300 may terminate and/or return to a calling process to perform other actions.

FIG. 4 illustrates a logical flow diagram generally showing one embodiment of a process 400 for inserting references to the k+1 copies of a source data record into the k-fault distribution tables. At least portions of process 400 (for instance blocks 406-420) may be iteratively applied to each of the M source data records to generate N k-fault distribution tables. For example, process 400 may be employed to generate the N k-fault distribution tables of block 302 of FIG. 3.

It should also be noted that when an additional source data record is added to the system, portions of process 400 (for instance blocks 406-420) may enable the appending of k+1 copies of this M+1 data record into the already existing N tables. When adding new source data records, additional rows may be added to each of the k+1 tables and M is incremented by 1.

After a start block, process 400 proceeds to block 402 where the initial matching server availability is determined. Determining the initial matching server availability at block 402 may be similar to the various embodiments discussed in the context of block 204 of FIG. 2. At block 402, at least the number N of initially available matching servers is determined, where N is a positive integer.

At block 404, the fault tolerance level k is determined, where k is a positive integer and 0≤k<N. At block 406, the serial ID Tag is determined for a source data record. Process 400 will place k+1 references or copies of each of the M source data record into the N k-distribution tables. The reference may be based on the serial ID Tag. In some embodiments, the serial ID Tag (S) is an integer and 0≤S<M.

At block 408, the initial current position of the data record associated with the serial ID Tag (S) is determined. The initial current position may be based on the serial ID Tag S. In at least one embodiment, the initial current position is equivalent to S.

For purposes of notation, the N initially available matching servers or workers are referenced as $W_0, W_1, \ldots W_{N-1}$. In at least one embodiment, the servers are numbered or indexed from 0, 1, ..., N−1, thus 0≤$W_i$≤N−1. The first copy of the source data record is initially distributed to the initially available N matching servers via the round robin method. Thus, a reference to (or the first copy of) of the data record that is uniquely associated with S is inserted into the first column of one of the tables via the round robin method. As discussed below, when applying the round robin method, the table that the first copy is inserted into is determined by the cyclic distance of S in view of N.

Briefly, blocks 410-420 include a process for distributing the k+1 copies of the source data record associated with S among the N k-fault distribution tables. For each of the k+1 copies, blocks 410-420 are iterated over. The number of currently alive matching servers of workers N' is decremented for each iteration over blocks 410-420. For instance, during the first iteration (the initial round robin), N'=N and the first copy of the data record or template associated with S is inserted into the first column (column index=0) of a table. The table that the data record will be inserted into is based on the cyclic distance of the current position of the data record associated with S and the number of currently alive N'. In various embodiments, the current position is based on S. The next position of the data record is based on the current position and the number of alive servers N'.

For the next iteration through blocks 410-420, N' is decremented (N'=N'-1). The current position is updated based on the next position. The second copy of the data records is associated with the second column of the next table. The next table is determined based on the updated current position and the decremented number of alive servers N'. The next position is determined based on the current position and the decremented number of alive servers N'. Blocks 710-720 are iterated over until all k+1 copies of the data record are distributed to the N k-fault distribution tables. When another source data record is added, process 400 may begin at block 406 to distribute the k+1 copies of the $(M+1)^{th}$ source data record.

At block 410, the cyclic distance is determined for the copy of the data record. In various embodiments, the cyclic distance (D) is based on the current position and the number of currently alive matching servers N'. As mentioned above, initially N'=N. The cyclic distance D is the distance that is derived for finding the next worker that the data record should be copied to from its current position. The distance is calculated by employing a modulo operator, where the currently alive matching servers N' is the divisor and the dividend is the current position. Thus, $$D = \text{Current Position} \% N'$$

where % represents the modulo operator.

At block 412, a reference to a copy, or a copy, of the source data record is inserted into a k-fault distribution table. In various embodiments, the table that the reference to the copy is inserted into is based on the cyclic distance D. In at least one embodiment, the copy is inserted into the table that is indexed as D. For instance, if D=1, the copy is inserted into table that is index 1. In embodiments where the indexing of the table begins at 1, If D=0, then the cyclic distance is the same as the number of alive servers N'. Accordingly, the next copy will be made on the server that is the same as the number of alive servers N'.

The column that the copy is inserted into in the determined table is based on the number of alive matching servers N'. In at least one embodiment, the column is based on the number of initially available matching servers N and the alive matching servers N'. The index of the column may be equivalent to (N−N'). Thus, as N' is decremented during the iterations, the column index is incremented.

At decision block 414, it is determined if N'>(N−k). When N'=N−k, then each of the k+1 copies of the source data records have been distributed to the k-fault distribution tables. Accordingly, if N'>(N−k) is not true, then process 400 may terminate and/or return to a calling process to perform other actions. If N'>(N−k) is true, then process 400 flows to block 416.

At block 416, the next position in the data source record is determined based on the current position and the number of alive matching servers N'. In at least one embodiment, the next position=(current position/N'). At block 418, the current position is updated to be equivalent to the next position. For example, current position=next position. At block 420, the number of alive matching servers is decremented, so that N'=N'-1. Process 400 flows back to block 410 to distribute the remaining copies of the source data record into other distribution tables.

FIG. 5 provides pseudo-code form of implementing one embodiment of a process for inserting references to the k+1 copies of a source data record into N k-fault distribution tables. In an illustrative example of the various embodiments for inserting references to the k+1 copies of a source data record into N k-fault distribution tables, consider a case where N=5, k=2, and k+1=3 copies of source data record will be inserted into the 5 k-distribution tables. The data record is serialized such that S=214000. The five matching servers (and the corresponding k-distribution tables) are denoted by $W_0$, $W_1$, $W_2$, $W_3$, and $W_4$. In each of the N distribution tables, the columns are indexed and denoted by 1, where $0 \leq 1 \leq k$.

Initially, the current position of the data record is equivalent to S=214000 and N'=N=5. During the first iteration of blocks 410-420 of process 400, the cyclic distance (D)=214000%5=0. Therefore, D is the same number of alive workers, which is currently 5. The first copy of the source data record is inserted into or associated with the first column (l=0) of the k-fault distribution table associated with $W_0$. The copy of the data record is inserted into the first available row in the first column of the $W_0$ distribution table.

Thus, the data record is initially distributed to the $W_0$ matching server. Two other copies of the data record must be associated with other distribution table entries in the case that the $W_0$ matching server fails. The next position of the data record is determined to be (current position/N')=(214000/5)=42800. The current position is updated to be the next position, such that current position=42800 and the number of alive servers is decremented such that N'=4.

To determine the next matching server to distribute the next copy of the data record to ensure fault tolerance in the case that the $W_0$ server fails, the cyclic distance of the data record is determined based on the current position and the number of alive servers N'. The cyclic distance D=42800%4=0. Thus, the second copy of the data record will be associated with the $W_4$ server. The second copy of the data record will be inserted into the second (1=1) column of the $W_4$ distribution table. Thus, in the event that the $W_0$ server fails, the $W_4$ server will perform the comparison task between the target data record and the source data record with S=214000.

To ensure fault tolerance in the event that both the $W_0$ and the $W_4$ servers fail, a third copy of the source data record will distributed to the tables. The next position is determined (42800/4)=10700 and the current position is set to the next position. The number of alive servers is decremented so that N'=3. The cyclic distance D=10700%3=2. Thus, the third copy of the data record is distributed to the third (l=2) column of the $W_2$ server. The $W_2$ server will perform the comparison between the target data record and the source data record in the event that both the $W_0$ and the $W_4$ servers fail. Because N'=3=(5-2), the process terminates.

In order to keep track of which servers have failed (and which are still available) during the matching task, various embodiments include a system bit mask. The initial system mask is represented by [0, 0, 0, 0, 0]. In the event that the $W_0$ server fails, the system bit mask is updated to be represented by [1, 0, 0, 0, 0]. In the event that both the $W_0$ and the $W_4$ servers fail, the system bit mask is updated to [1, 0, 0, 0, 1].

A data mask for each copy of the data source records is generated. The data mask indicates which server should pick up the data record in the event of a server fail. The first copy of the data mask corresponding with the above example is represented by [1, 0, 0, 0, 0], the second copy is associated with the data mask [0, 0, 0, 0, 1], and the third copy is associated with the data mask [0, 0, 1, 0, 0]. An AND binary operation between the system mask and the data mask indicates which worker is to pick up the data record.

Data Manager and Storage Engine

Various embodiments include a data manager and a storage engine. These components enable the efficient loading of source data records when one or more matching servers fail. When the work is initially distributed to the matching servers, the work is distributed substantially evenly between all the initially available servers. When a matching server fails, the failed server's work is picked by the other still available matching servers. Furthermore, the re-distributed work is distributed substantially evenly to the still available matching servers.

When one or more matching servers fail, the system's downtime is dependent upon how fast the still available matching servers may access, retrieve, or load the data that was initially distributed to the failed matching servers. In an exemplary embodiment, the total number of source data records is M=2E8, the number of initially available matching servers is N=50, and the maximum fault tolerance is k=5. Therefore, each of the available workers initially receives 4E6 source data records to process. In the event that 5 matching servers fail, 2E7 source data records need to be loaded by the remaining 45 matching servers. Each of the 45 matching servers must load and additional 4.4E5 data records.

Because k+1 copies of the M records are distributed among the N initially available matching servers, each matching server stores or caches M/N*(k+1)=2.4E8 source data records. When randomly accessing databases of this size, access speed may be limited to around 20-25 records per second. To randomly retrieve the 4.4E5 data records in the event of 5 matching server failures, at a rate of 20 records per second, 2.2E4s or 6.17 hours would be required.

A downtime of this significance would result in a significantly inefficient matching task. In preferred embodiments, the k+1 copies of the M data records are stored in multiple databases structured in a tree format. However, because the copies of the data source records are stored in separate databases, organized in a tree structure, such as tree 600 of FIG. 6, when a matching server fails, the data records may be sequentially read (as opposed to randomly) to minimize downtime.

Figure 7:
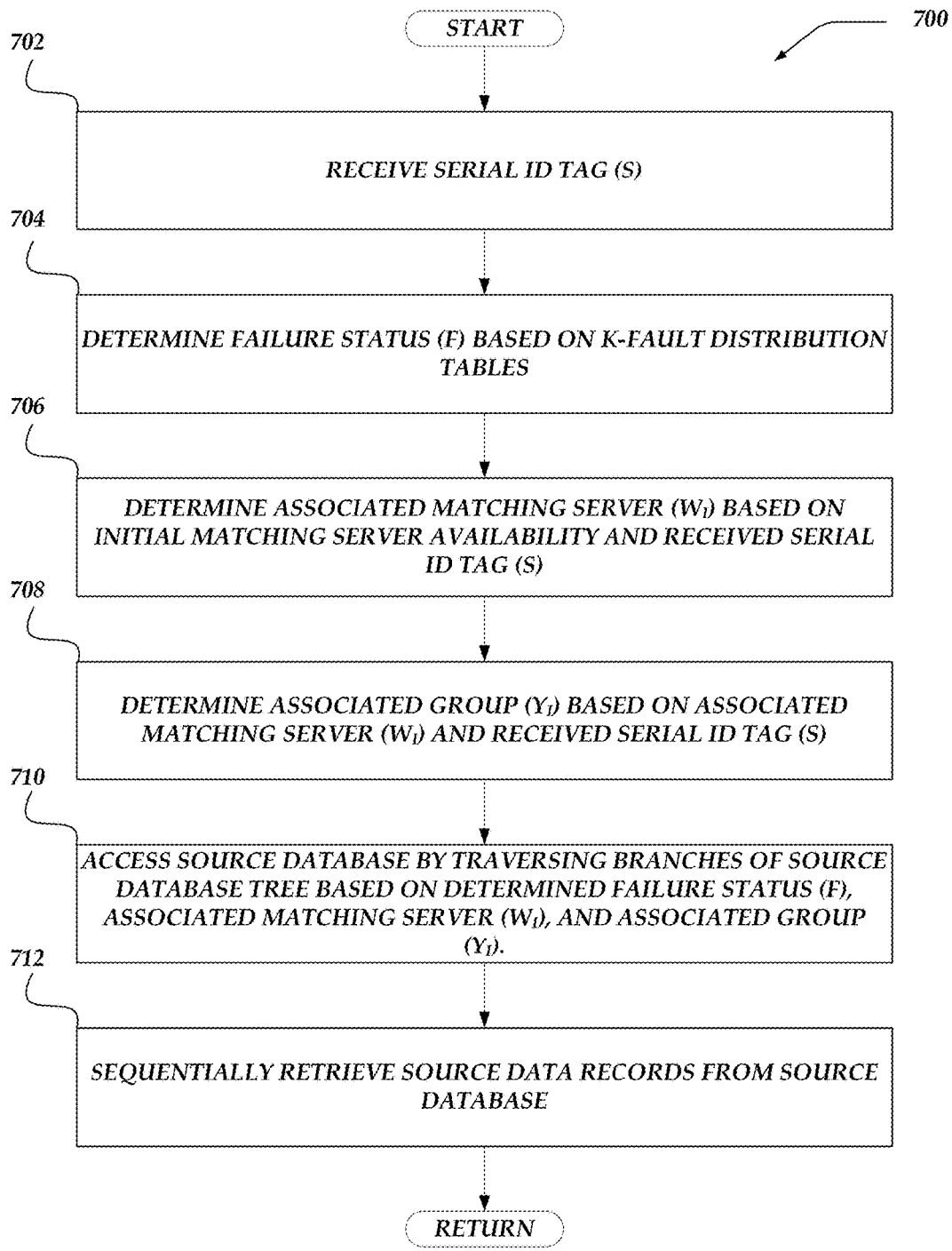
FIG. 7 illustrates a logical flow diagram generally showing one embodiment of a process for a matching server to sequentially access copies of data source records.

FIG. 7 illustrates a logical flow diagram generally showing one embodiment of a process 700 for a matching server to sequentially access copies of data source records. For instance, process 700 may begin when a matching server accesses the source data records it was initially distributed when the matching task begins. Furthermore, process 700 may begin when a matching server fails and the comparison load is re-balanced.

After a start block, process 700 flows to block 702, where a serial ID Tag S is received by a matching server. At block 704, the fault status F associated the received serial ID Tag S is determined. In various embodiments, the fault status is determined based on the k-fault distribution tables. The fault status indicates how many faults have occurred prior to the serial ID Tag arriving at the matching server. In various embodiments, F may be determined in a similar manner to that discussed in regards to block 304 of FIG. 3.

At block 706, the matching server $W_i$ associated with serial ID Tag S is determined. The associated matching server $W_i$ may be based on the initial matching server availability and the received serial ID Tag S. In at least one embodiment, $W_i$ is determined via a similar process to that discussed in the context of block 306 of FIG. 3, including a round robin method, such as S % N. $W_i$ corresponds to the matching server that the source data record was distributed to.

At block 708, the associated group $Y_i$ is determined based on $W_i$ and S. In various embodiments, $Y_i$ is determined via the pseudo-code provided in the context of block 310 of FIG. 3. At block 710, the branches of the tree structure 600 of FIG. 6 are traversed to arrive at the database node corresponding to F, $W_i$, and $Y_i$. At block 712, the data stored in the database nodes is sequentially retrieved or accessed.

Such embodiments enable reading twice as many data records in the worst case scenario. Therefore, if T data records must be read, process 700 enables reading 2T records. Given the above example where 4.4E5 records must be accessed, the downtime is reduced from 6.17 hours to 5.9 minutes.

Architecture for K-Fault Tolerant System

FIG. 8A shows a schematic view of various components included in an embodiment in an architecture for a k-fault tolerant system 800. System 800 includes a master 802 and a worker 804 that are communicatively coupled over a network 810. Master 802 may be similar to controller server 102 of system 100 of FIG. 1. Worker 804 may be similar to one of the matching servers in system 100, such as matching server_0 104 of system 100. Worker 804 may be a node.

The master 802 is the entry point for any request that may include add, update, find, verify, and the like. The request may originate from a client device 816. Client device 816 may be similar to client device 116 of FIG. 1. Client device 816 is also commutatively coupled to network 810. If the master 802 is down, system 800 becomes unresponsive. In preferred embodiments, the master server 802 is the strongest device to guard against such unresponsiveness.

The master 802 includes a global database 814. The global database 814 may be a remote database that is managed centrally. Global database 814 may be stored locally or remotely by data storage, such as data storage 114 of FIG. 1. The master 802 uses the global database 814 through an interface. The global database 814 may be a SQL database.

System 800 includes a k-fault table component, module, or sub-system. The k-fault table component includes a k-fault table master 846 that manages a k-fault table worker 826 that stored at least a copy of the k-fault distribution table corresponding to worker 802. The k-fault table master 846 may generate each of the k-fault distribution tables for each of the workers. The k-fault table 826 corresponding to worker 804 may be stored locally or remotely from worker 804.

System 800 includes additional components, modules, objects, or sub-systems. System 800 includes a transaction manager, a version manager, a synchronization manager, and a storage engine. The transaction manger includes a transaction manager worker 832 and a transaction worker master 852. The version manager includes a version manager worker 834 and a version manager master 854. The synchronization manager includes a synchronization manager worker 836 and a synchronization manager master 856. The storage engine includes a storage engine worker 822 and a storage engine master 842. System 800 may include a data manager 824 and a memory cache 828 for the worker 822.

The transaction manager may be invoked when there is any addition, update, or deletion transaction in regards to the data records. The transaction manager logs the transactions and at least partially manages system 800 when a reboot is required, such as a system crash.

The version manager manages updating the data records to ensure consistency in identifying the latest among two transactions. For example, at time $x_1$, a source data record, such as a fingerprint template, is updated. At time $x_2$, the same data record is updated again. If worker 804 receives the update of time $x_2$ and if the update at time $x_1$ is not checked then the latest data will be replaced by the old data.

The version manager component ensures consistency when updating the versions. The serial ID Tags for the data records includes a version number. Initially, the version number for each of the ID Tags is set to 0. When a record is updated the version number increments by one. Accordingly, between any two transactions, system 800 determines which version is associated with the higher version number so that the latest data records are incorporated into the analysis.

Figure 8:
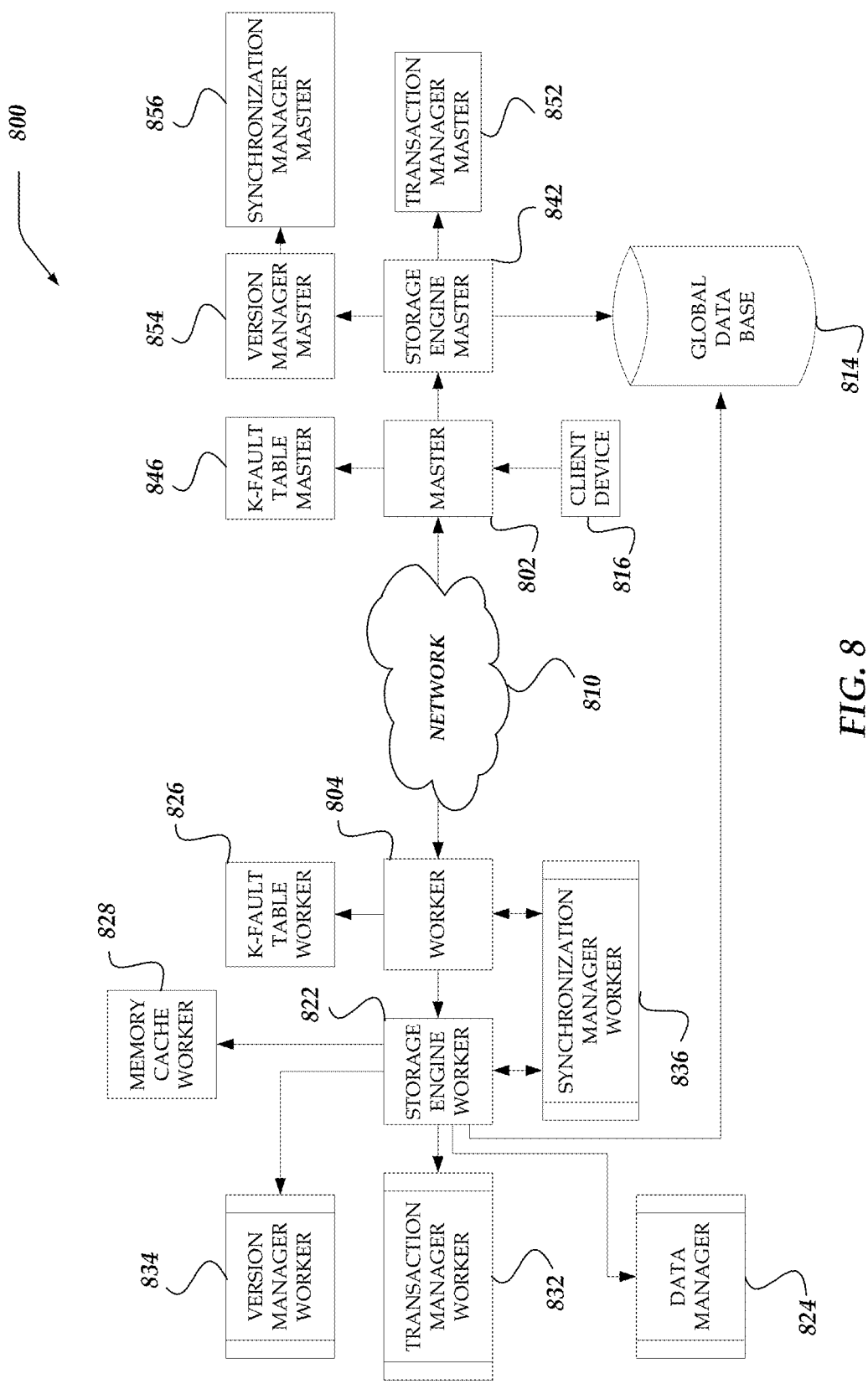
FIG. 8 shows a schematic view of various components included in an embodiment of an architecture for a k-fault tolerant system.
Figure 9A:
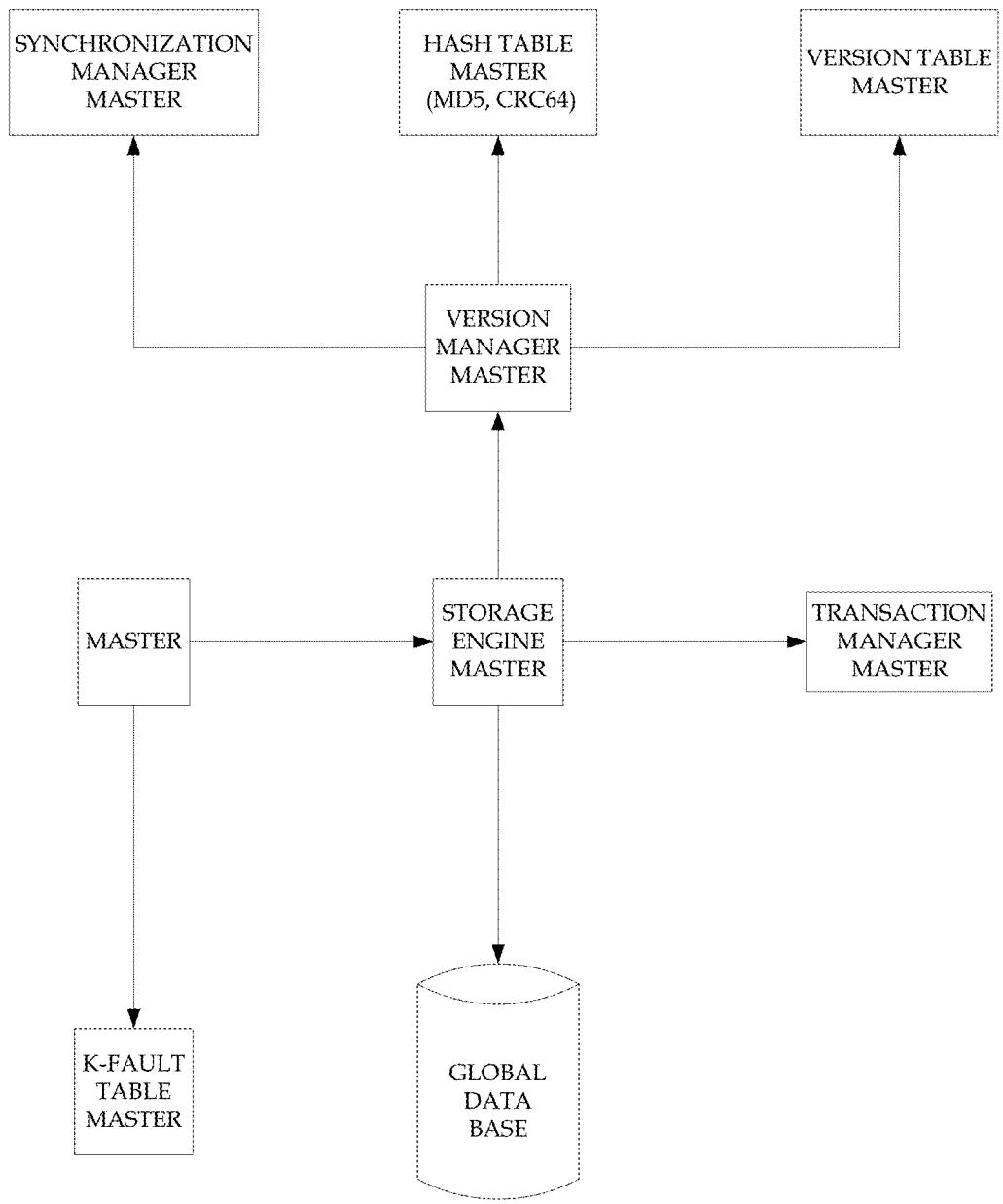
FIG. 9A shows a schematic view of various components associated with the master of the fault-tolerant system of FIG. 8.
Figure 9B:
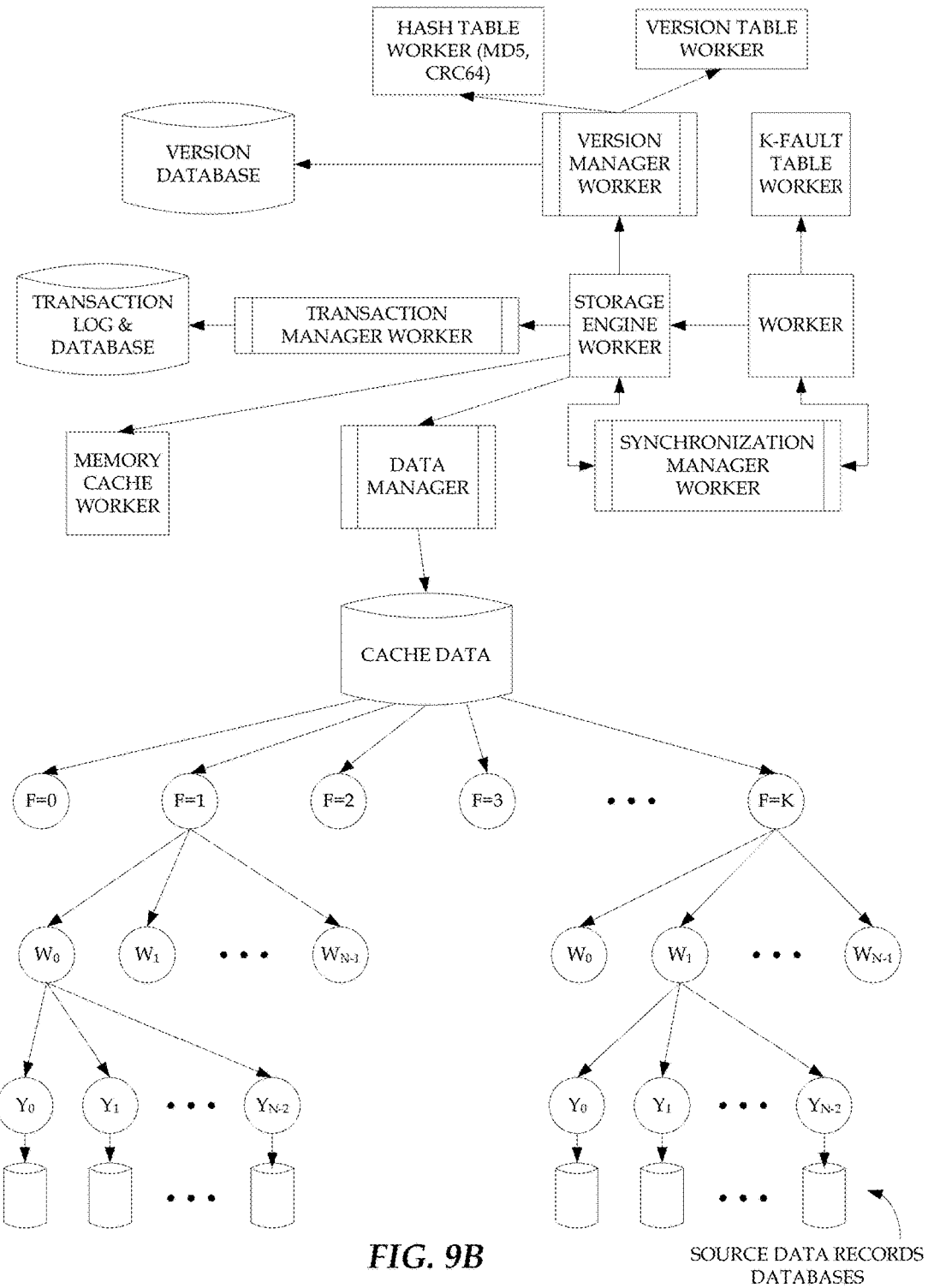
FIG. 9B shows a schematic view of various components associated with the worker of the fault-tolerant system of FIG. 8.

FIG. 9A shows a schematic view of various components associated with master 802 of fault-tolerant system 800 of FIG. 8. FIG. 9B shows a schematic view of various components associated with worker 804 of fault-tolerant system 800 of FIG. 8. The version manager component employs two tables: a version table and a hash table, as shown in FIGS. 9A-9B. The version table holds records of the version of each data record. The version table has further been divided in numerous chunks. Each chunk's md5 hash record is kept in the hash table. The hash table is employed so that only the updated data needs to be synchronized and/or updated. Thus, the hash table minimizes the required time to synchronize the updated data records.

The synchronization manager is to synchronize between the master 802 and the worker 804. There can be a significant amount of additions or updates in the master 802. For instance, if the worker 804 goes offline, and after a while the worker computer becomes available again, the synchronization manager automatically updates the worker computer.

In an exemplary embodiment, there are 20 source data records and 20 corresponding serial ID Tags. In the version table each and every chunk size is 4. The synchronization manager has a delta packet. The delta packet holds the hash table version global number that is initially set to 0.

System 800 may include a version controller component. The version controller specifies the maximum number of data records system 800 may store. As discussed above, each data record is associated with a unique serial ID Tag or number and a separate version number is maintained for each version of each data record. The serial number is paired with another unique key, for example a national ID number. For each update or change in the record, the version number is incremented by one. The master 802 also maintains a similar version number. When a version mismatch occurs between the master 802 and the worker 804, the worker 804 will know that the information needs to be updated.

A hash number includes a set and a limit to the set size. In an illustrative embodiment, the set size is 2. If more than two different chunks are updated, the hash is updated. Furthermore, the hash table version global number is incremented and the hash number set becomes empty. For synchronization, the master 802 sends a delta packet to the worker. The worker 804 server determines if the worker hash table version global number matches with the hash number of the master server.

If the two hash numbers match, then only the chunks that have a hash number in the hash number set will be matched with hashes of the corresponding chunk. If the hash numbers do not match, then that chunk's version number will be obtained from the master server. System 800 will determine which serial ID Tag's version is mismatched with that of its own. The details of the associated source data records will be received from the main database and synchronize accordingly. If the hash table version global number does not match, the entire hash table will be retrieved from the master. Synchronization may undergo a similar process.

Accordingly, system 800 achieves efficiency and consumes less bandwidth. In system 800, whenever there is an addition or update, the serial ID Tag in incremented by one. As such, serial ID Tags are assigned sequentially. To calculate the hash, a 64 bit CRC is used.

In an exemplary embodiment, a serial ID Tag for a source data record is 200000000. If the version table is required to be transmitted, the bandwidth required is Number of serial×4 bytes=762 MB.

Figure 9C:
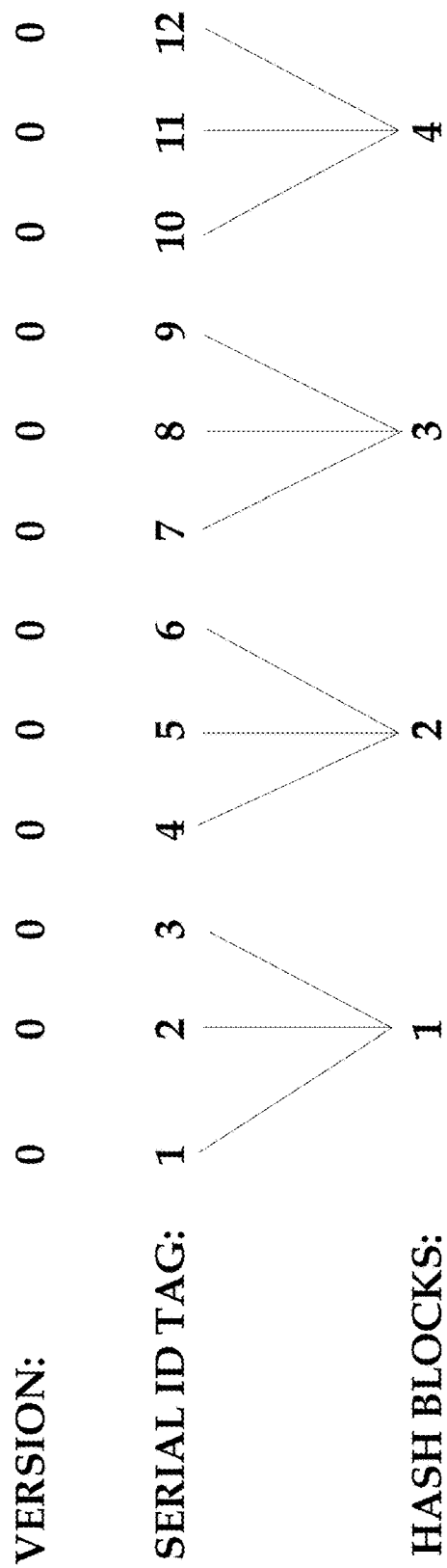
FIG. 9C illustrates a schematic representation of a process for dividing data records into group and assigning a hash block to each of the groups.

FIG. 9C illustrates a schematic representation of a process for dividing data records into groups and assigning a hash block to each of the groups. In the procedure, first 100×1024 and then later the hash packet goes otherwise the delta packet always goes. The bandwidth required is 100×128 bits=1.56 kb. Accordingly, the procedure achieves a significant reduction in required bandwidth and a greater efficiency.

Data is divided into groups. For example if there are 200,000,000 data and we divide them into groups of 1000, the number of groups will be 20,000. This grouping allows the bandwidth requirement to go down. Each group is also further assigned a hash. A 128 bit hash is generated and each hash also has a version number.

For each update in the record that takes place, first the version number is updated for that serial. Then the hash of the group or block is updated. A global count is also maintained. Say for example if updates are made in more than two blocks then the global count goes up. The worker sees that the global count has gone up. It then asks for only those blocks that are updated. In this way the architecture ensures that the worker does not need to pull a large amount of data from the master in order to sync itself. The worker will only pull those blocks which have been updated. This ensures lower bandwidth consumption and greater speed.

Figure 10A:
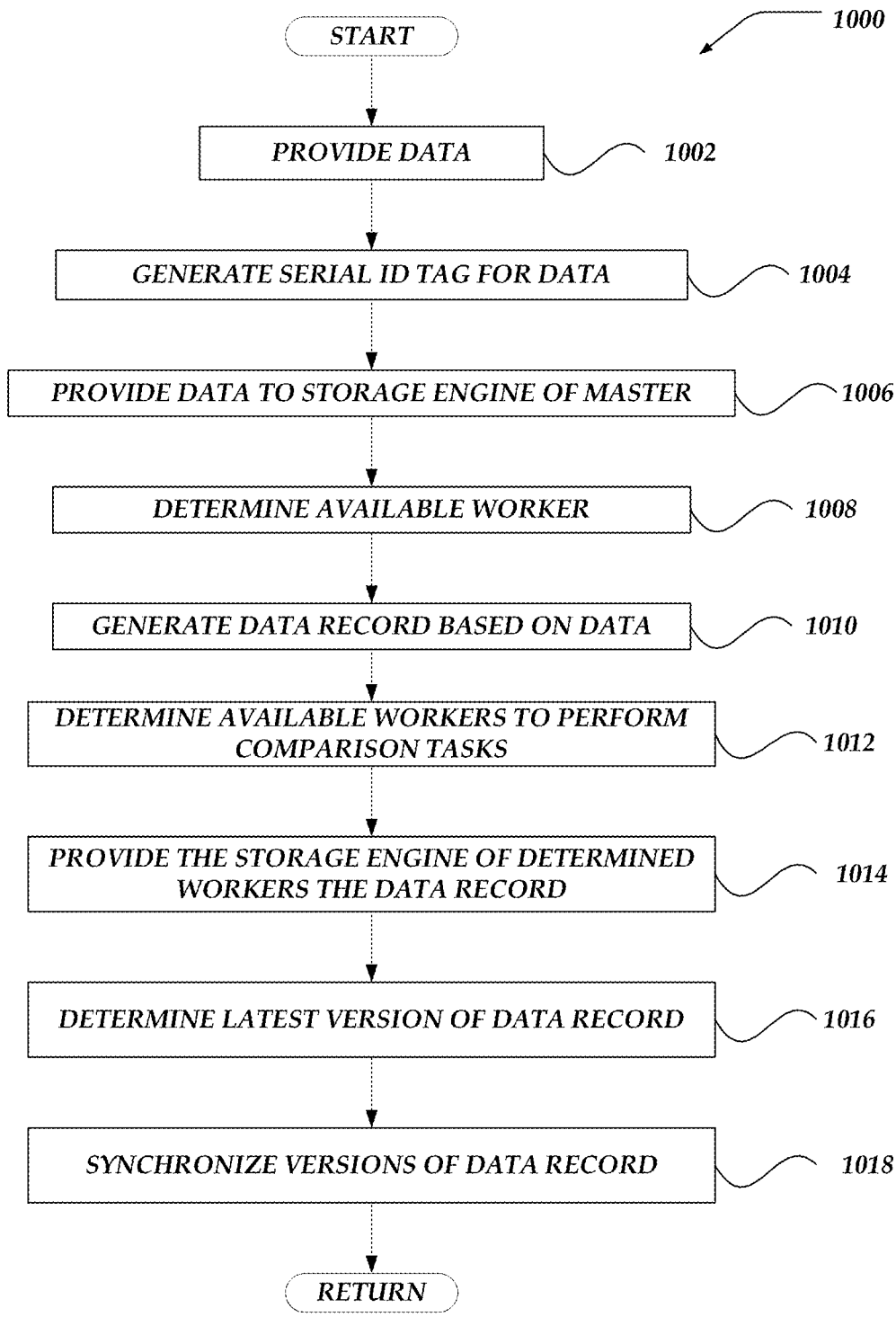
FIG. 10A illustrates a logical flow diagram generally showing one embodiment of a process for a data identification system that is consistent with the embodiments described herein.

FIG. 10A illustrates a logical flow diagram generally showing one embodiment of a process 1000 for a data identification system that is consistent with the embodiments described herein. After a start block, process 1000 proceeds to block 1002, where data is provided to the system. In various embodiments, the system may include similar features of system 100 of FIG. 1 and/or system 800 of FIG. 8. A client device, such as client device 16 of system 100 or client device 816 of system 800 may provide data, such as fingerprint data, to the system. The system may be an Automated Fingerprint Identification System (AFIS).

At block 1004, a serial ID Tag is generated for the data. In various embodiments, a master, such as master 802 of system 800, or a controller server, such as controller server 102 of system 100, generates the serial ID Tag. The serial ID Tag may include a serial number. For an "add" request, the master generates a new serial number against the ID number. For an "update" or "delete" request, the master fetches the corresponding serial number from a database, such as global database 814 of system 800.

At block 1006, the master provides data to a storage engine of the master, such as storage engine master 842 of system 800. The storage engine master writes the record in a transaction manager. The storage engine updates the version of the serial ID in master version manager.

At block 1008, an available worker is determined. In various embodiments, a worker may include a matching server, such as matching servers 104-108 of system 100 or any of the workers of FIGS. 8-9C. A worker may be a node. The master may determine an available worker. The master may send the available worker an AFIS task. The task may be a packet including the serial ID Tag, the data (for instance target/source data or a target/source fingerprint), and a version number.

At block 1010, a data record is generated based on the data. In some embodiments, the available worker converts the data (a fingerprint image) into a template. The worker stores the template in the main database employing the storage engine.

At block 1012, a plurality of available workers is selected to perform comparison tasks. For instance, the worker may employ the k-fault tables to determine which of the workers should receive data for the comparison tasks. At block 1014, each of the storage engines of the workers are provided with the data records, based on the corresponding k-fault distribution tables.

At block 1016, the latest version of each of the data records is determined. The storage engine (of each worker) checks for the latest version of the data records by employing the version manager. If the worker has the latest data cached, then the transaction is logged into the transaction manager. The version manager and the data manager provides the latest updated data records.

At block 1018, the version of the data records are updated. In various embodiments, the synchronization manager synchronizes the worker's version manager by checking for the latest version of data from the master's version manager. The local databases (within the tree structure) are updated. Upon completion of block 1018, process 1000 is terminated.

State of Machines for K-Fault Tolerant System

Figure 10B:
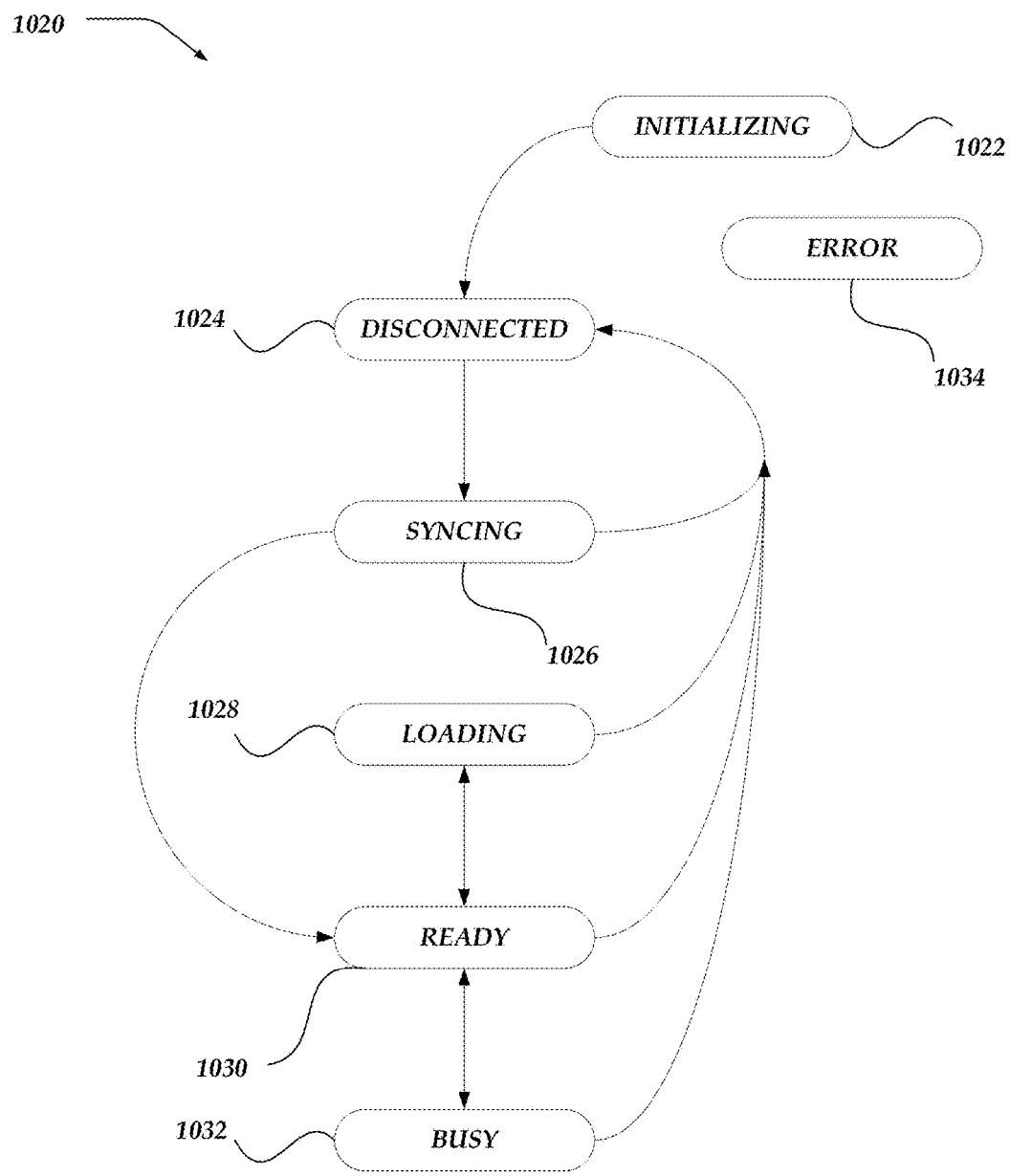
FIG. 10B shows a state diagram for a worker device consistent with the various embodiments disclosed herein.

FIG. 10B shows a state diagram for a worker device 1020 consistent with the various embodiments disclosed herein. The worker 1020 includes an initializing state 1022, a disconnected state 1024, a syncing state 1026, a loading state 1028, a ready state 1030, a busy state 1032, and an error state 1034. Upon start-up, the worker 1020 is in the initializing state. In the disconnected state, the worker 1020 is disconnected from the network. When synchronization starts, the worker 1020 is in the synching state 1026. The ready state 1030 indicates when the workers are synchronized in the network and are ready to serve comparison requests from the master.

In the busy state 1032, the worker 1020 receives requests from the master, such as add, update, delete, search, and verify. When the worker 1020 is loading data, such as when other workers are unavailable or have failed, the worker 1020 is in the loading state 1028. When there is an unrecoverable error, the worker 1020 transitions to the error state 1034.

Figure 10C:
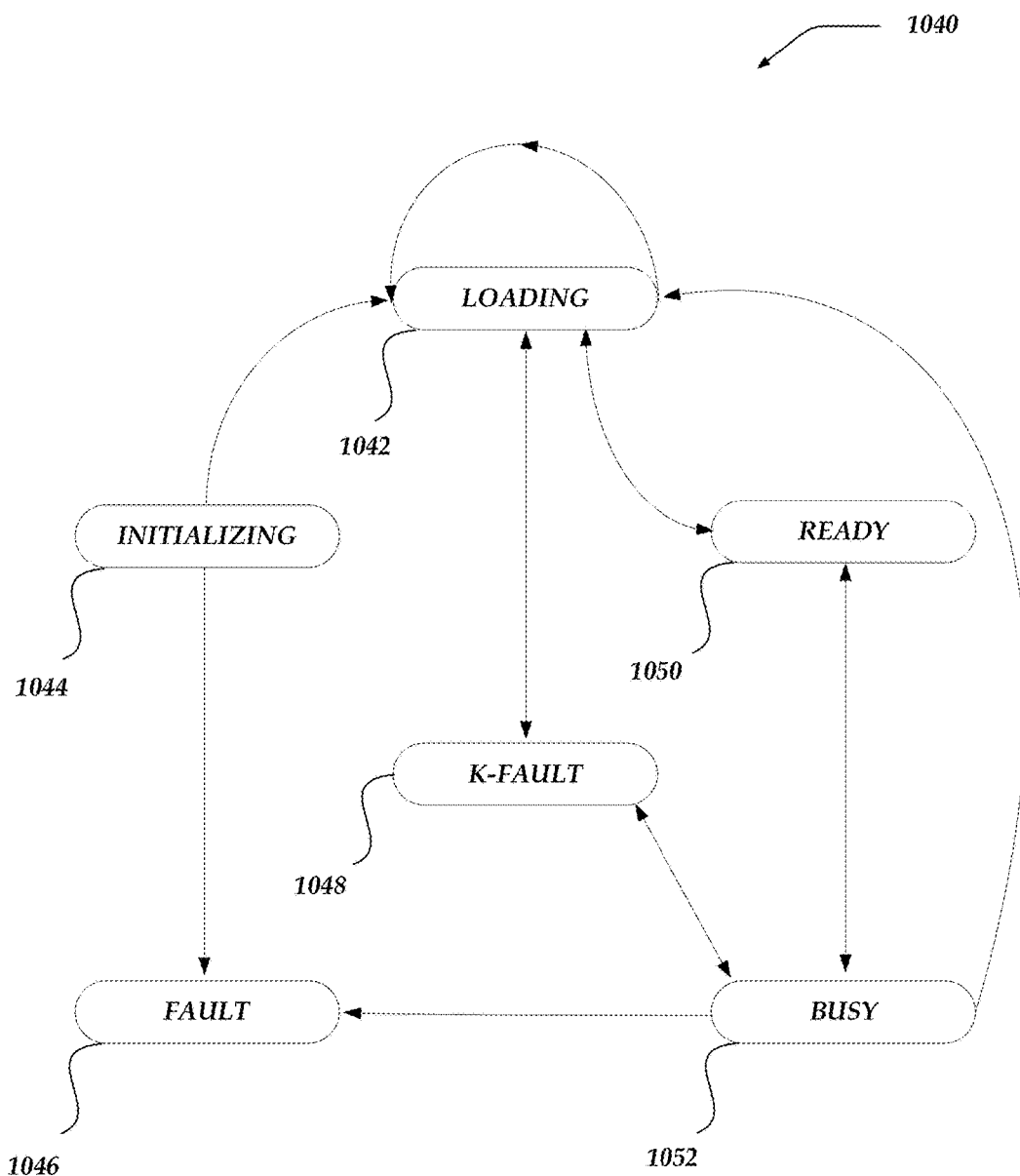
FIG. 10C shows a state diagram for a master device consistent with the various embodiments disclosed herein.

FIG. 10C shows a state diagram for a master device 1040 consistent with the various embodiments disclosed herein. In the initializing state 1044, the master 1040 checks the connectivity with its workers (checks if the workers are in ready state, if they are available or down). The loading state 1042 is the state when all the workers switches from "ready" state to "loading" state to partially load data (when a new worker joins the master or an existing worker goes down). The ready state 1050 is the state when all workers are available. The K-fault state 1048 is the state when 1≤k'≤k; where k' is the number of current workers down and k is the maximum number of fault tolerance. The fault state 1046 is the state when k'>k. In the busy state 1052, all the workers under the master are in the busy state 1032 of FIG. 10B.

Illustrative Use Cases

Figure 11:
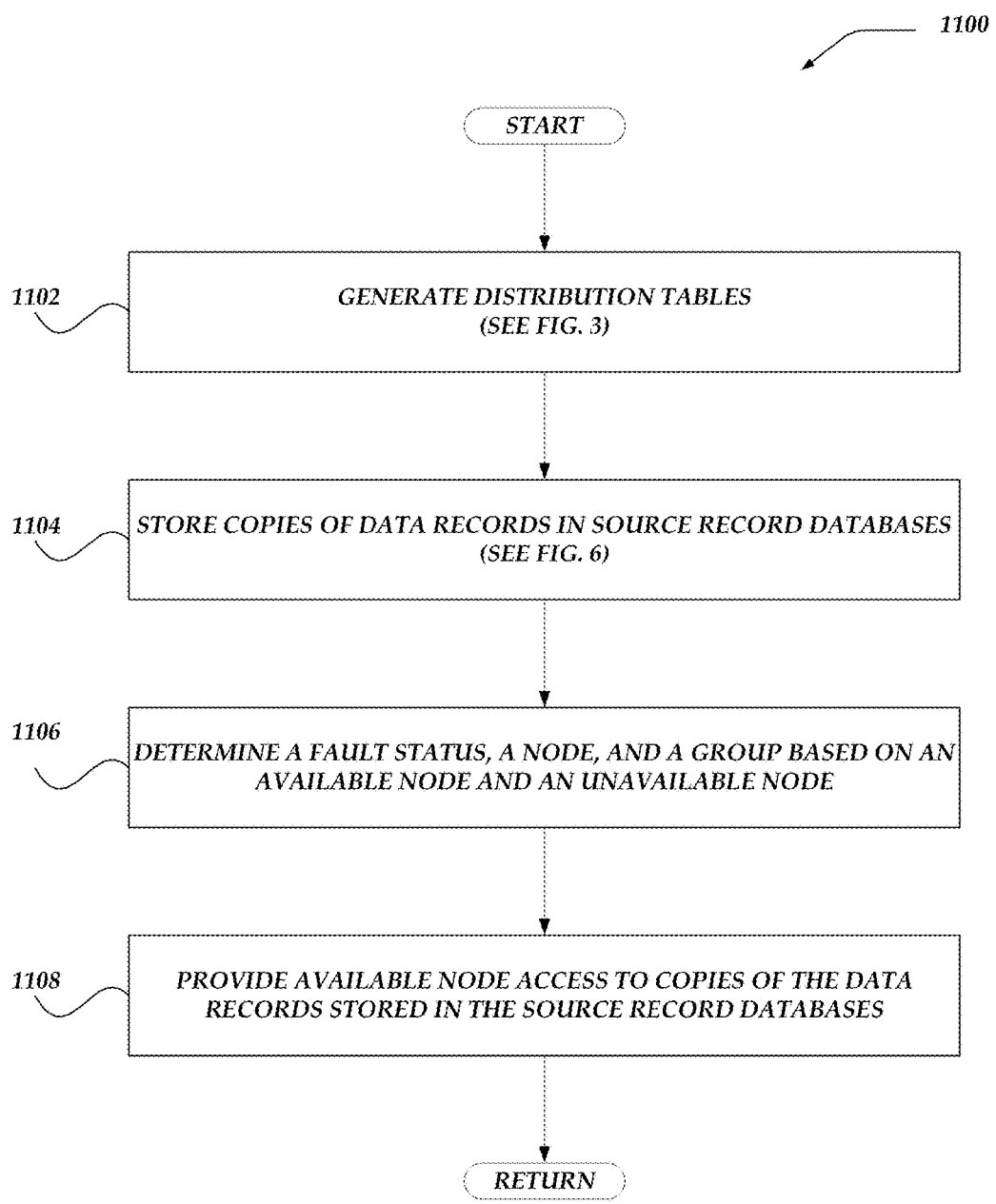
FIG. 11 illustrates a logical flow diagram generally showing one embodiment of a fault-tolerant process consistent with the embodiments described herein.

FIG. 11 illustrates a logical flow diagram generally showing one embodiment of a fault tolerant process 1100 consistent with the embodiments described herein. Process 1100 may be a process for distributing a plurality of data record to a plurality of nodes, workers, or matching servers. In at least one embodiment, process 1100 is a matching process.

After a start block, process 1100 flows to block 1102. At block 1102, a plurality of distribution tables are generated. Various embodiments of generating distribution tables are discussed in the context of FIG. 3. Each of the distribution tables may be a k-fault distribution table. Each entry in the distribution tables corresponds to a copy of one of the plurality of the data records. Each entry and copy of the data record is associated with a fault status, a node, and a group based on a position of the entry within the distribution tables.

At block 1104, copies of the data records are stored in source databases. Various embodiments of storing data records in source databases are discussed throughout, including at least in the context of FIG. 6. Specifically, for each entry in the distribution tables, a copy of the data record that corresponds to the entry is stored in a database included in a plurality of databases. The database that the copy of the data record is stored in corresponds to the fault status, the node, and the group based on the position of the corresponding entry.

At block 1106, a fault status, a node, and a group are determined based on an available node and an unavailable node. In at least one embodiment, the determination is in response to an unavailability of one or more nodes and one or more available nodes.

At block 1108, an available node is provided access to copies of the data records stored in the source record databases. In some embodiments, one or more available nodes is provided access to at least a portion of the copies of data records that are stored in a particular database. The particular database corresponds to the determined fault status, the node, and the group. Upon completion of block 1108, process 1100 is terminated.

Illustrative Computer Device

Figure 12:
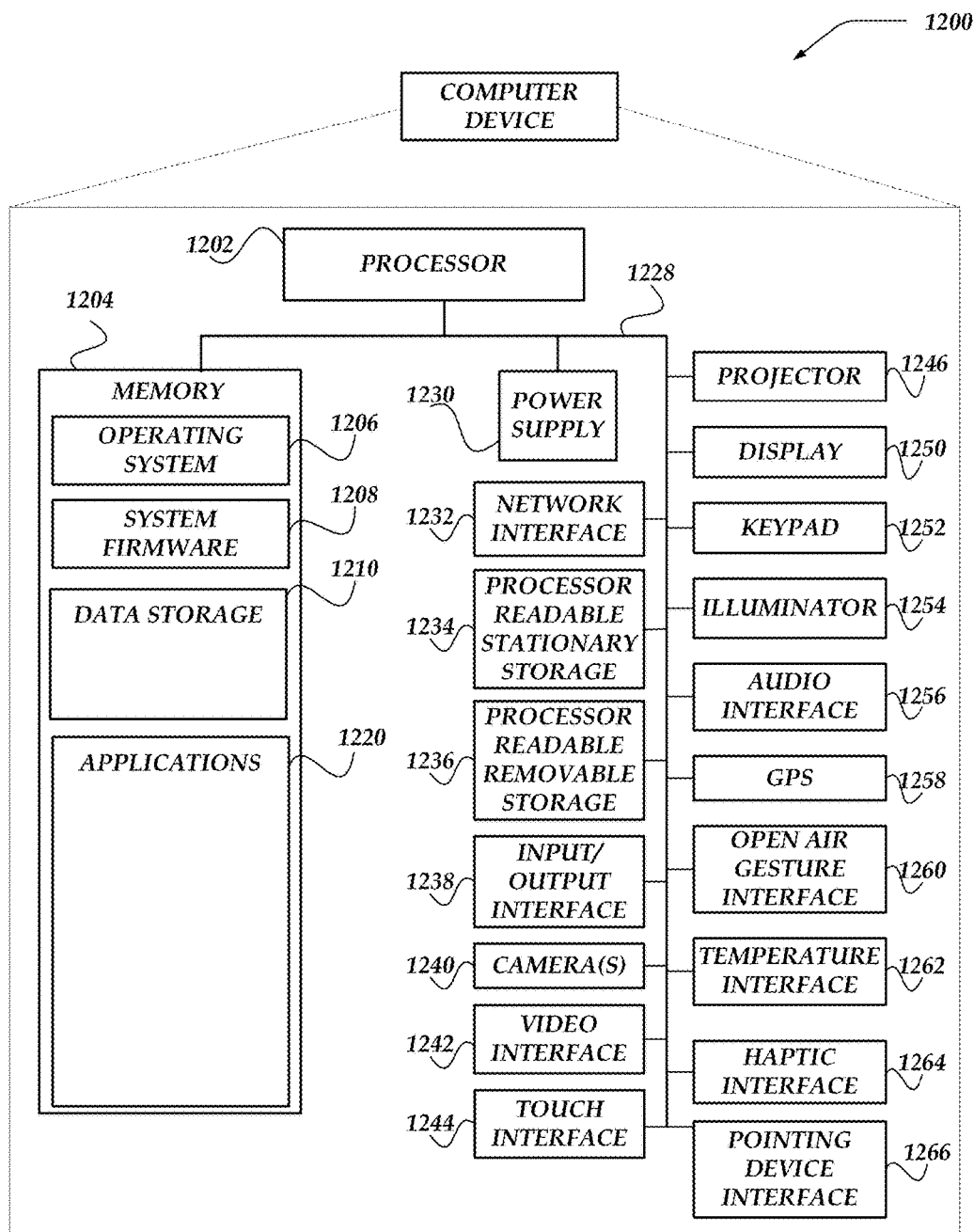
FIG. 12 illustrates an embodiment of a computing device that may be included in any of the various embodiments disclosed herein.

FIG. 12 shows one embodiment of a computing device 1200 that may include many more or less components than those shown. Computing device 1200 may represent any of the computing devices discussed herein, including, but not limited to controller server 102, database server 112, client device 116, and matching servers 104-108 of FIG. 1. Furthermore, computing device 1200 may represent any of the masters or workers discussed throughout, including at least the master and workers of FIGS. 8-10C. Computing device 1200 may be a node.

Computing device 1200 may include processor 1202, such as a central processing unit (CPU), in communication with memory 1204 via bus 1228. Computing device 1200 may also include power supply 1230, network interface 1232, processor-readable stationary storage device 1234, processor-readable removable storage device 1236, input/output interface 1238, camera(s) 1240, video interface 1242, touch interface 1244, projector 1246, display 1250, keypad 1252, illuminator 1254, audio interface 1256, global positioning systems (GPS) receiver 1258, open air gesture interface 1260, temperature interface 1262, haptic interface 1264, pointing device interface 1266, or the like. Computing device 1200 may optionally communicate with a base station (not shown), or directly with another computer. And in one embodiment, although not shown, an accelerometer or gyroscope may be employed within computing device 1200 to measuring and/or maintaining an orientation of computing device 1200.

Additionally, in one or more embodiments (not shown in the figures), the client device may include an embedded logic hardware device instead of a CPU. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the client device may include a hardware microcontroller instead of a CPU. In at least one embodiment, the microcontroller would directly execute its own embedded logic to perform actions and access its own internal memory and its own external Input and Output Interfaces (e.g., hardware pins and/or wireless transceivers) to perform actions, such as System On a Chip (SOC), and the like.

Power supply 1230 may provide power to computing device 1200. A rechargeable or non-rechargeable battery may be used to provide power. The power may also be provided by an external power source, such as an AC adapter or a powered docking cradle that supplements and/or recharges the battery.

Network interface 1232 includes circuitry for coupling computing device 1200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 1232 is sometimes known as a transceiver, transceiving device, or network interface card (NIC).

Audio interface 1256 may be arranged to produce and receive audio signals such as the sound of a human voice. For example, audio interface 1256 may be coupled to a speaker and microphone (not shown) to enable telecommunication with others and/or generate an audio acknowledgement for some action. A microphone in audio interface 1256 can also be used for input to or control of computing device 1200, e.g., using voice recognition, detecting touch based on sound, and the like.

Display 1250 may be a liquid crystal display (LCD), gas plasma, electronic ink, light emitting diode (LED), Organic LED (OLED) or any other type of light reflective or light transmissive display that can be used with a computer. Display 1250 may also include a touch interface 1244 arranged to receive input from an object such as a stylus or a digit from a human hand, and may use resistive, capacitive, surface acoustic wave (SAW), infrared, radar, or other technologies to sense touch and/or gestures.

Projector 1246 may be a remote handheld projector or an integrated projector that is capable of projecting an image on a remote wall or any other reflective object such as a remote screen.

Video interface 1242 may be arranged to capture video images, such as a still photo, a video segment, an infrared video, or the like. For example, video interface 1242 may be coupled to a digital video camera, a web-camera, or the like. Video interface 1242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 1252 may comprise any input device arranged to receive input from a user. For example, keypad 1252 may include a push button numeric dial, or a keyboard. Keypad 1252 may also include command buttons that are associated with selecting and sending images.

Illuminator 1254 may provide a status indication and/or provide light. Illuminator 1254 may remain active for specific periods of time or in response to events. For example, when illuminator 1254 is active, it may backlight the buttons on keypad 1252 and stay on while the mobile device is powered. Also, illuminator 1254 may backlight these buttons in various patterns when particular actions are performed, such as dialing another mobile computer. Illuminator 1254 may also cause light sources positioned within a transparent or translucent case of the mobile device to illuminate in response to actions.

Computing device 1200 may also comprise input/output interface 1238 for communicating with external peripheral devices or other computers such as other mobile computers and network computers. Input/output interface 1238 may enable computing device 1200 to communicate with one or more servers, such as MCSC 110 of FIG. 1. In some embodiments, input/output interface 1238 may enable computing device 1200 to connect and communicate with one or more collection computers, such as collection computers 112 of FIG. 1. Other peripheral devices that computing device 1200 may communicate with may include remote speakers and/or microphones, headphones, display screen glasses, or the like. Input/output interface 1238 can utilize one or more technologies, such as Universal Serial Bus (USB), Infrared, Wi-Fi, WiMax, Bluetooth™, wired technologies, or the like.

Haptic interface 1264 may be arranged to provide tactile feedback to a user of a client computer. For example, the haptic interface 1264 may be employed to vibrate computing device 1200 in a particular way when another user of a computer is calling. Temperature interface 1262 may be used to provide a temperature measurement input and/or a temperature changing output to a user of computing device 1200. Open air gesture interface 1260 may sense physical gestures of a user of computing device 1200, for example, by using single or stereo video cameras, radar, a gyroscopic sensor inside a computer held or worn by the user, or the like. Camera 1240 may be used to track physical eye movements of a user of computing device 1200.

GPS transceiver 1258 can determine the physical coordinates of computing device 1200 on the surface of the Earth, which typically outputs a location as latitude and longitude values. GPS transceiver 1258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 1200 on the surface of the Earth. It is understood that under different conditions, GPS transceiver 1258 can determine a physical location for mobile device 1200. In at least one embodiment, however, computing device 1200 may, through other components, provide other information that may be employed to determine a physical location of the mobile computer, including for example, a Media Access Control (MAC) address, IP address, and the like.

Human interface components can be peripheral devices that are physically separate from computing device 1200, allowing for remote input and/or output to computing device 1200. For example, information routed as described here through human interface components such as display 1250 or keyboard 1252 can instead be routed through network interface 1232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A client computer may include a browser application that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view sensor data. Memory 1204 may include RAM, ROM, and/or other types of memory. Memory 1204 illustrates an example of computer-readable storage media (devices) for storage of information such as computer-readable instructions, data structures, program modules or other data. Memory 1204 may store system firmware 1208 (e.g., BIOS) for controlling low-level operation of computing device 1200. The memory may also store operating system 1206 for controlling the operation of computing device 1200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 1204 may further include one or more data storage 1210, which can be utilized by computing device 1200 to store, among other things, applications 1220 and/or other data. For example, data storage 1210 may also be employed to store information that describes various capabilities of computing device 1200. The information may then be provided to another device or computer based on any of a variety of events, including being sent as part of a header during a communication, sent upon request, or the like. Data storage 1210 may also be employed to store social networking information including address books, buddy lists, aliases, user profile information, or the like. Data storage 1210 may further include program code, data, algorithms, and the like, for use by a processor, such as processor 1202 to execute and perform actions. In one embodiment, at least some of data storage 1210 might also be stored on another component of computing device 1200, including, but not limited to, non-transitory processor-readable removable storage device 1236, processor-readable stationary storage device 1234, or even external to the mobile device.

Applications 1220 may include computer executable instructions which, when executed by computing device 1200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, computing device 1200 may be enabled to employ various embodiments, combinations of embodiments, processes, or parts of processes, as described herein.

The various communications networks discussed here, such as network 108 of FIG. 1 or network 810 of FIG. 8 may include virtually any wired and/or wireless technology for communicating with a remote device, such as, but not limited to, USB cable, Bluetooth, Wi-Fi, or the like. In some embodiments, the network may be a network configured to couple network computers with other computing devices, such as computing device 1200. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between client computers 102-105, SDSC 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

From the foregoing it will be appreciated that, although specific embodiments have been described herein for purposes of illustration, various modifications may be made without deviating from the spirit and scope of this disclosure. For example, the methods, techniques, and systems for the automatic verification and quality assurance of travel documents are applicable to other architectures or in other settings. Also, the methods, techniques, and systems discussed herein are applicable to differing protocols, communication media (optical, wireless, cable, etc.) and devices (e.g., desktop computers, wireless handsets, smart phones, electronic organizers, personal digital assistants, tablet computers, portable email machines, game machines, pagers, navigation devices, etc.).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A fault-tolerant method for distributing a plurality of data records to a plurality of nodes, the method comprising:

generating one or more distribution tables, wherein each entry in the one or more distribution tables corresponds to a copy of one of the plurality of the data records and is associated with at least one of a fault status, a node, and a group based on a position of the entry within the one or more distribution tables;

for each entry in the one or more distribution tables, storing the copy of the data record that corresponds to the entry in a database included in a plurality of databases, wherein the database that the copy of the data record is stored in corresponds to at least one of the fault status, the node, and the group based on the position of the corresponding entry;

in response to determining one or more unavailable nodes of the plurality of nodes, determining at least one of a fault status, a node, and a group based on the one or more unavailable nodes and one or more available nodes of the plurality of nodes;

providing the one or more available nodes access to at least a portion of the copies of data records that are stored in a particular database of the plurality of databases, wherein the particular database corresponds to at least one of the determined fault status, the node, and the group;

determining a cyclic distance based on the current position and a count of the plurality of nodes; and generating a correspondence between a copy of the particular data record and an entry in the one or more distribution tables, wherein a position of the entry is based on the cyclic distance.

2. The method of claim 1 further comprising:

determining a serial identification (ID) associated with a particular data record of the plurality of data records; and determining a current position based on the serial ID.

3. The method of claim 2 further comprising:

updating the current position based on a ratio of the current position and the count of the plurality of nodes;

determining another cyclic distance based on the updated current position and the count of the plurality of nodes; and generating another correspondence between another copy of the particular data record and another entry in the one or more distribution tables, wherein a position of the other entry is based on the other cyclic distance.

4. The method of claim 1, further comprising sequentially accessing the portion of the data records stored in the particular database, wherein the particular database is stored locally at the one or more available nodes.

5. The method of claim 1, wherein the particular database is accessible via a tree structure that includes a fault status level, a node level, and a group level.

6. The method of claim 1, wherein one or more of the plurality of data records is a biometric template.

7. The method of claim 1, wherein each of the plurality of databases that corresponds to a particular fault status stores a substantially equivalent number of data records.

8. The method of claim 1, wherein providing the one or more available nodes access to at least a portion of the copies of data records further includes providing each of a plurality of available nodes access to a substantially equivalent number of data records.

9. The method of claim 1, wherein k is a fault tolerance of the method, N is a number of nodes included in the plurality of nodes, each of the plurality of nodes is uniquely associated with a number of databases included in the plurality of databases, the number of databases associated with each of the plurality of nodes is equal to a product of factors including (k+1), N, and (N−1), and k+1 copies of each of the plurality of data records is stored in the plurality of databases.

10. The method of claim 1, further comprising:
 updating a version of at least one of the plurality of data records; and
 synchronizing each of the plurality of databases that includes a copy of the at least one updated plurality of data records based on the updated version of the at least one of the plurality of data records.

11. The method of claim 3 further comprising determining another cyclic distance based on the updated current position and an updated count of the plurality of nodes.

* * * * *